United States Patent [19]

Ninomiya et al.

[11] 4,307,420

[45] Dec. 22, 1981

[54] MOTION-COMPENSATED INTERFRAME CODING SYSTEM

[75] Inventors: Yuichi Ninomiya; Yoshimichi Ohtsuka, both of Kawasaki, Japan

[73] Assignee: Nippon Hōsō Kyōkai, Tokyo, Japan

[21] Appl. No.: 155,786

[22] Filed: Jun. 2, 1980

[30] Foreign Application Priority Data

| Jun. 7, 1979 | [JP] | Japan | 54-70628 |
| Jun. 7, 1979 | [JP] | Japan | 54-70629 |
| Jun. 7, 1979 | [JP] | Japan | 54-70630 |
| Jun. 7, 1979 | [JP] | Japan | 54-70631 |
| Jun. 7, 1979 | [JP] | Japan | 54-70632 |

[51] Int. Cl.³ .............................................. H04M 7/12
[52] U.S. Cl. ..................................... 358/136; 358/105; 375/27
[58] Field of Search ............... 358/133, 135, 136, 105, 358/138; 364/515; 375/28, 27

[56] References Cited

U.S. PATENT DOCUMENTS

| 3,715,483 | 2/1973 | Limb et al. | 358/135 |
| 3,767,847 | 10/1973 | Haskell et al. | 358/135 |
| 4,027,331 | 5/1977 | Nicol | 358/135 |
| 4,047,221 | 9/1977 | Yasuda et al. | 358/136 |
| 4,060,832 | 11/1977 | Devimeux et al. | 358/133 |
| 4,173,771 | 11/1979 | Iijima | 358/135 |
| 4,179,710 | 12/1979 | Ishiguro et al. | 358/135 |
| 4,202,011 | 5/1980 | Koga | 358/136 |
| 4,217,609 | 8/1980 | Hatori et al. | 358/136 |
| 4,218,704 | 8/1980 | Netravali et al. | 358/136 |
| 4,232,338 | 11/1980 | Netravali et al. | 358/136 |
| 4,245,248 | 1/1981 | Netravali et al. | 358/136 |

FOREIGN PATENT DOCUMENTS

2062922 12/1969 Fed. Rep. of Germany ...... 358/133

*Primary Examiner*—Robert L. Richardson
*Assistant Examiner*—Edward L. Coles
*Attorney, Agent, or Firm*—Stevens, Davis, Miller & Mosher

[57] ABSTRACT

An interframe coding system provided for highly efficient transmission of coded television picture signal is improved by compensating prediction error of predicted picture motion in response to interframe correlation detected by shifting moving blocks in a direction opposite to a motion vector detected for predicting interframe picture motion in order to reduce an amount of coded signals to be transmitted, and further improved regarding the detection of motion vector by examining interframe correlation referred to accumulated logarithms of absolute values of interframe differential picture element signals, and still further improved regarding the compensation of predicted picture motion by changing a coding threshold level in response to picture motion and further by effecting more exact secondary prediction of picture motion. According to these improvements, an extremely high efficiency of transmission of precisely and correctly coded interframe picture signal can be attained.

32 Claims, 30 Drawing Figures

(Preceding Frame)    (Present Frame)

(n)　Attended Block in (n+1)

(n+1)

Prediction: $\bar{x} = 2y - z$

Prediction: $\bar{x} = y + (u - v)$

MOTION-COMPENSATED INTERFRAME CODING SYSTEM

BACKGROUND OF THE INVENTION (1) Field of the Invention

The present invention relates to a motion-compensated interframe coding system for coding a television picture signal under the compensation of the coded signal in response to the variation of the television picture, which is caused by the motion thereof, on account of the motion vector representing the shift of the picture between adjacent frames thereof, particularly, to the improvement of the above system.

(2) Description of the Prior Art

The recently accustomed digitization of the television picture signal has been adopted in various kinds of equipments used for the television broadcast, for instance, a video tape recorder because of the easiness of the time base correction and the freedom from injurious noise which can be attained by the digitization thereof. However, the digitization of the television picture signal requires the extremely broadened frequency band. That is, the bandwidth required for the analog colour television signal of the NTSC system is 4.5 MHz, whilst the bandwidth required for the ordinary digitization thereof is 90 MHz. So that, the frequency band compression of maximally high degree is required for the digilized colour television signal.

On the other hand, the considerably high redundancy can be found in the television picture signal. Accordingly, the considerably large amount of the information to be transmitted can be reduced for the digitized television picture signal by utilizing the above redundancy skillfully.

The television picture signal coding systems having the high efficiency as mentioned above can be classified into two groups, that is, such a group of coding systems for treating the picture signal of each frame individually as the DPCM system or the Hadamard conversion system and such another group of coding systems for treating picture signals of plural successive frames as a whole as the so-called interframe coding system.

In the interframe coding system for the television picture signal, the above redundancy is utilized in the direction of time axis thereof. The television picture signal has the considerable similarity between adjacent frames. Particularly, the still picture signal has the sameness between adjacent frames. Accordingly, after the completely coded picture signal of the first frame has been transmitted, the remaining picture signals of the succeeding frames can be transmitted by coding only the differences between adjacent frames with the high efficiency and the sufficient quality in the interframe coding system.

However, the moving picture signal has a considerable amount of differences between adjacent frames, so that the increase of the informations to be coded which is caused by the motion of the picture is the sore spot of the interframe coding system.

Nevertheless, a fair amount of correlation between adjacent frames can be found even in the moving picture signal. Particularly, it can be found frequently in the moving picture that a small block thereof is merely shifted between adjacent frames. Accordingly, in case the simple correlation between adjacent frames is obtained after the above shift is compensated in response to the motion of picture detected between adjacent frames, the amount of significant differences between adjacent frames can be reduced remarkably even in the moving picture signal, so that the interframe coding can be effected with an extremely high efficiency for the moving picture signal.

An ordinary circuit configuration of the motion compensated interframe coding system based on the detection of the motion vector representing the motion of picture is shown in FIG. 1. In the sending end of the system shown in FIG. 1, an incoming picture signal is applied to a quantizer 2 through a subtracter 1. The quantized picture signal is applied through an adder 3 to a predictor 4 which comprises a frame memory 5, a motion detector 6 and a motion compensator 7 for detecting the motion vector between the present frame and the immediately preceding frame. The motion vector derived from the motion detector 6 is multiplexed to the quantized picture signal by a multiplexer 8, so as to be transmitted to the receiving end, as well as the quantized picture signal derived from the frame memory 5 is compensated by the above motion vector in the motion compensator 7, so as to form an interframe predicted signal which should be subtracted from the incoming picture signal in the subtractor 1.

In the receiving end, the preceding frame picture signal derived from a frame memory 11 is compensated in a motion compensator 12 by the motion vector separated from the received picture signal by a demultiplexer 9, so as to reproduce the same interframe predicted signal as in the sending end. The reproduced interframe predicted signal is added in an adder 10 to the interframe differential signal derived from the demultiplaxer 9, so as to restore the original picture signal.

The motion compensation based on the detected motion vector as mentioned above can be utilized for the following various applications:

(i) Application to the industrial motion measurement for detecting an intricate motion of a moving body.

(ii) Application to the correction of the vibration of picture which is caused equally in the whole area by the vibration of a camera and accordingly can be detected easily by detecting the partial motion.

(iii) Application to the noise reduction of the picture signal owing to the contrast between the rich correlation of the picture signal and the poor correlation of the noise.

The aforesaid motion compensation based on the detected motion should be applied effectively in particular for the noise reduction of the moving picture signal because of the comparatively poor correlation thereof. However, the direction and the velocity of partial motion of the moving picture can be detected hardly by the conventional method for detecting the motion vector.

The following method is well known for detecting the partial motion of the television picture or the televised cinema film and will be explained by referring to two adjacent frames as shown in FIG. 2.

By the above well known method, a block having an appropriate size is selected in the present frame of the above two adjacent frames. The above selected block is assumed to contain n picture elements having numbers $1, \ldots, n$ and signal levels $B_1, \ldots, B_n$ respectively, where the symbol $B_i$ denotes the signal level of the picture element i. Similarly, another block having the same size is selected in the immediately preceding frame, and is assumed to contain n picture elements having respectively voltage levels Bi similarly as mentioned above. Under these assumptions, the correlation C between those two blocks can be obtained by the calculation according to the following equation.

$$C = \sum_{i=1}^{n} |Ai - Bi|.$$

That is, the above calculation is carried out repeatedly with regard to the variously shifted positions of the block selected in the preceding frame respectively, so as to obtain the position thereof which presents the strongest correlation to the block selected in the present frame. As the result, the motion vector of the picture in the present frame can be obtained as the difference between the position vector in the present frame and that in the preceding frame.

The mentioned above will be explained more concretely by referring to the following example, that is, the motion of picture which is represented by three circles (n−1), n and (n+1), the positions of which are shifted successively between three adjacent frames n−1, n and n+1, as shown in FIG. 3.

Nextly, FIG. 4 shows the case that the motion is detected between the frames n−1 and n. In FIG. 4, the solid rectangle represents the size of the block selected for detecting the motion of picture, the solid circle represents a picture of a body shown in the preceding frame, the chain-lined circle represents a picture of another body, and, the above mentioned solid rectangle represents the block attended in the present frame. Regarding a position of the last rectangle, nine blocks, which are shifted in eight directions, namely, upward, downward, left, right and four oblique directions and positioned at the center (not shifted), are settled in the preceding frame, so as to obtain the motion vector based on the position of the settled block having the highest conrrelation to the original solid rectangle. In FIG. 4, a unit of shift is represented by a mark of |—| similarly as hereinafter, and a dotted big line shows the above block having the strongest correlation, and further arrow marks show that plural kinds of motion vectors are obtained as an inaccurate result of the above detection of motion.

Similarly as mentioned above, FIG. 5 shows the case that the motion is detected between the frames n and n+1, in which case the same as above is repeated with a similarly inaccurate result of the detection of motion. In FIG. 5, a dotted thin line surrounding the blocks indicates a range in which those blocks can be positioned.

In the above examples of the conventional method for detecting the motion, the correct motion vector is that shown by the big arrow mark only, and the correlation should be examined regarding nine blocks, so that the obtained result of the detection of motion is insufficient. Moreover, the simply increased number of blocks to be examined regarding the correlation cannot assure the possibility of the detection of correct motion. That is, in order to detect the sufficiently correct motion, it is required to settle a large number of blocks in the whole area of the frame to be examined. Even if a practically possible number of blocks is restricted, it is impossible in practice to examine the correlations regarding all of those blocks in a certain desired time duration.

According to the above mentioned method for detecting the motion vector, the pattern recognition regarding a body in the picture is not required at all, so that such an advantage as the motion vector can be detected mechanically. Contrarily, according to the above method, as mentioned above, an extremely broad area and an extremely large number of blocks to be examined for detecting the motion vector, so that it is not realizable to detect the motion vector at the real time because of the time duration required for the calculation of the above method. Accordingly, it is an inevitable subject for detecting the motion vector how to detect the more correct motion vector based on the less number of times of calculations for examining the correlations within a desired time duration. Therefore, various methods for accomplishing the above subject have been investigated, so as to improve the above conventional method for realizing the possibility of the real time detection of motion.

One of those improved method for detecting the motion vector will be explained hereinafter.

The above improved method for detecting the motion vector is based on the fact that, in the case that, after the motion between the frames n−1 and n has been detected, the motion between the frames n and n+1 will be detected, if the positions of the blocks settled in the frame n are shifted previously by a distance corresponding to the already detected motion in the opposite direction from the reference position thereof, the correlation can be examined between the blocks settled in an area having the highest probability and the original block the motion vector relating to which should be detected, so that, regardless of the limitation of the number of times of the calculation for examining the correlation, the more correct motion vector can be obtained.

Nextly, in the case the above improved method is applied to the detection of motion as shown in FIG. 3, the detection of motion in the first step, that is, the detection of motion between the frames n−1 and n is performed similarly as mentioned above. However, in the second step in which the detection of motion between the frames n and n+1 is performed by referring to the calculated result for the above detection of motion in the first step, the position of the block in the frame n, which block is compared with the attended block (the solid rectangle) in the frame n+1 for calculating the interframe correlation, is shifted previously by a distance corresponding to the motion detected between the frames n−1 and n in the opposite direction from the reference position as shown in FIG. 6. In FIG. 6, the reference position is shown by a double dotted chain line, and the shift vector is shown by a dotted double arrow mark. According to the mentioned above, regardless of the same number of blocks to be examined regarding the correlation as according to the conventional method shown in FIG. 4, that is, nine blocks, it can be recognized that the correct motion between the frames n and n+1 can be detected. The motion between the frames n+1 and n+2 and so on can be detected correctly by repeating the similar calculation as mentioned above.

According to the above improved method, the detection of motion in the first step is not sufficiently correct, whilst that in the second step and so on is correct. On the other hand, if the detection of motion in the second step is attended, it is apt to be considered that it is possible according to the aforesaid conventional method to examine the twice number of blocks in the twice longer time duration and, as a result, to obtain the same effect as according to the improved method. However, the above consideration is mistaken as the following example shows.

FIG. 7 shows the case that eighteen blocks are examined between those two frames, and the area surrounded by a dotted big line shows the range in which the correlation is examined. It is certified in this case that the motion can be detected correctly. However, if the motion is performed as shown in FIG. 8, such a case can take place that no more correct motion is detected as shown in FIG. 9. In contrast therewith, it is possible according to the above improved method to detect the correct motion in a half time duration of that according to the conventional method, as shown in FIG. 10.

Apparently from the mentioned above, according to the improved method, the number of correlations to be calculated at every frame is not so many, so that it is possible to detect the more correct motion vector at real time. However, the above improved method has such a further defect as follows:

Generally speaking, in order to detect the motion vector, at first, the correlation of the pictures between two adjacent frames is detected according to any one of the following three methods, and then the motion vector of the picture is detected by referring to the strength of the detected correlation. According to the first method, the weaker the square correlation of signal levels of respectively corresponding picture elements between two adjacent frames is, that is, the smaller the square of the signal level differences between those picture elements is, the stronger the correlation of the picture signals between those two frames is. According to the second method, the smaller the absolute value of the difference of signal level between those picture elements is, the stronger the correlation of the picture signals between those two frames is. Furthermore, according to the third method, the lesser the number of picture elements the differences of signal levels of which exceed the appropriately settled threshold level is, the stronger the correlation of the signal levels between those two frames is.

However, according to those method for obtaining the square correlation or the absolute value correlation, in the case that, even if a specified target body having a signal level which is extremely different from those of surrounding portions moves in a picture frame, the specified target body is small, it is feared that the motion thereof is taken hold of as a whole motion of blocks provided in the picture frame for examining the above correlation of picture elements between those blocks. The reason thereof is that the correlation regarding the whole blocks is decided by the difference of picture signal levels in the portions occupying respectively large areas of those blocks. On the other hand, according to the above method employing the threshold level, such an advantage can be obtained that the circuit configuration required for detecting the motion vector is simplified, as well as it is impossible to detect the motion vector regarding a picture having no signal levels which exceed the threshold level. Consequently, all of those three conventional methods for detecting the motion vector have such defects as the motion of contents of the picture frame cannot be detected sufficiently.

SUMMARY OF THE INVENTION

An object of the present invention is to provide a motion-compensated interframe coding system in which the aforesaid various defects are removed.

Another object of the present invention is to provide a motion-compensated interframe coding system in which, even if a moving target body in a television picture is small, or, a difference of picture signal level thereof between adjacent frames is small, the motion of contents thereof can be detected sufficiently.

Still another object of the present invention is to provide a motion-compensated interframe coding system in which, even if any discontinuity of motion exists in a picture, the motion of the picture can be detected smoothly.

Further anoth object of the present invention is to provide a motion-compensated interframe coding system in which, even if any error exists in a result of the detection of motion of the picture, a picture having no deterioration of picture quality, which is caused by the above error of the detection of motion, can be reproduced after the compensation based on the motion of the picture is effected thereon.

Further still another object of the present invention is to provide a motion-compensated interframe coding system in which any spurious contour is not formed at all in response to contents of a picture reproduced from a coded picture signal.

Still further another object of the present invention is to provide a motion-compensated interframe coding system in which, even if a secondary prediction of a motion of a picture is effected on the strength of a significant interframe difference of picture signal levels which is discriminated by referring to a threshold level provided for coding picture signals, any error of prediction contained in a coded interframe differential picture signal to be transmitted is not increased at all.

The feature of the present invention is that, in a motion-compensated interframe coding system, a group of plural blocks having respective positions shifted successively are settled in every frames of a television picture, and further, with respect to each of those plural blocks, another group of plural blocks corresponding thereto respectively and having respective position shifted in various directions being different from each other is settled in the immediately preceding frame, and then one of plural blocks belonging to the latter group, which one has the highest correlation to each of plural blocks belonging to the former group is detected, so as to obtain a motion vector of the television picture, and furthermore, particularly for the examination of the above correlation, a logarithm of an absolute value of a difference of signal levels between picture elements corresponding to each other in those two blocks to be examined regarding the correlation is accumulated over whole areas of those two blocks, so as to obtain the correlation between those two blocks of the television picture.

In the case of the above accumulation of the logarithm of the absolute value of differential picture signal, regarding the absolute value being near upon zero, the absolute value itself is accumulated because of the indefinitiveness of the longarithm of zero. Accordingly, the logarithm in this case can be regarded as a quasi-logarithm as it were.

The present invention will be explained in more detail with regard to preferred embodiments by referring to the accompanied drawings.

DESCRIPTION OF THE PREFERRED EMBODIMENTS

Firstly, in the motion vector detecting method employed in the motion-compensated interframe coding system according to the present invention, similarly as the aforesaid improved method, plural picture elements contained in each of blocks settled in a picture frame are numbered successively, and it is assumed that all of sizes of those blocks are equal to each other and the positions of those blocks are shifted respectively in respective directions and by respective distances, corresponding to the respective shift vectors representing relative positions between each other of those blocks, and further, under the condition that those shift vectors are varied in various manners, the correlations between those blocks are examined, so as to adopt one of those shift vectors which one represents the strongest correlation as the motion vector.

Furthermore, in the motion vector detecting method according to the present invention, regarding two adjacent frames of the television picture, the signal levels of picture elements in the present frame are designated by Bi successively, whilst those in the immediately preceding frame are designated by Ai, and the correlation between each other of blocks settled in those frames respectively is represented by an accumulated value defined as follows.

$$\sum_{i=1}^{n} \log_2 |Ai - Bi|$$

Although it seems at a glance to be very difficult to calculate a logarithm based on 2, that is, $\log_2$ in a practical circuitry, it can be attained by a comparatively simple and easy operation in practice in the case that the picture signal is digitized into a binary coded signal, since a word length of a binary coded difference of signal levels between picture elements belonging to two adjacent frames respectively, that is, a number of figures proper of the binary-coded signal consists of a logarithm based on 2 of the binary code representing the picture signal level.

By the way, regarding the above $\log_2$ also, a quasi-$\log_2$ is calculated similarly as mentioned before.

Figure 11:
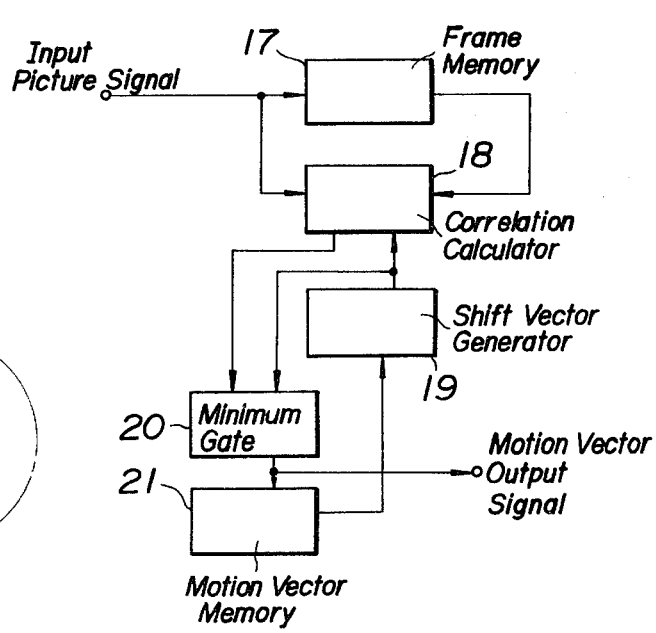
FIG. 11 is a block diagram showing a basic configuration of a motion-compensated interframe coding apparatus according to the present invention.

Nextly, a basic configuration of a motion-compensated interframe coding apparatus provided for performing the above mentioned motion detection based on the examination of the interframe correlation is shown in FIG. 11. In FIG. 11, an input picture signal is stored in a frame memory 17 during one frame interval, and then a correlation regarding attended blocks between two adjacent frames of the input picture signal, which are derived from an input side and an output side of the frame memory 17 respectively, is calculated in a correlation calculator 18. A relatively shifted position of the attended block in an immediately preceding frame, which is required for the above calculation of the correlation according to the present invention, is applied from a shift vector generator 19 to the correlation calculator 18. In response to the correlations regarding blocks surrounding the shifted block which are derived from the correlation calculation 19 successively, a motion vector corresponding to the strongest correlation can be obtained in a minimum gate 20, so as to be taken out from an output terminal as well as to be stored in a motion vector memory 21 provided for applying it to the shift vector generator 20 as an input signal at a next frame.

Figure 12:
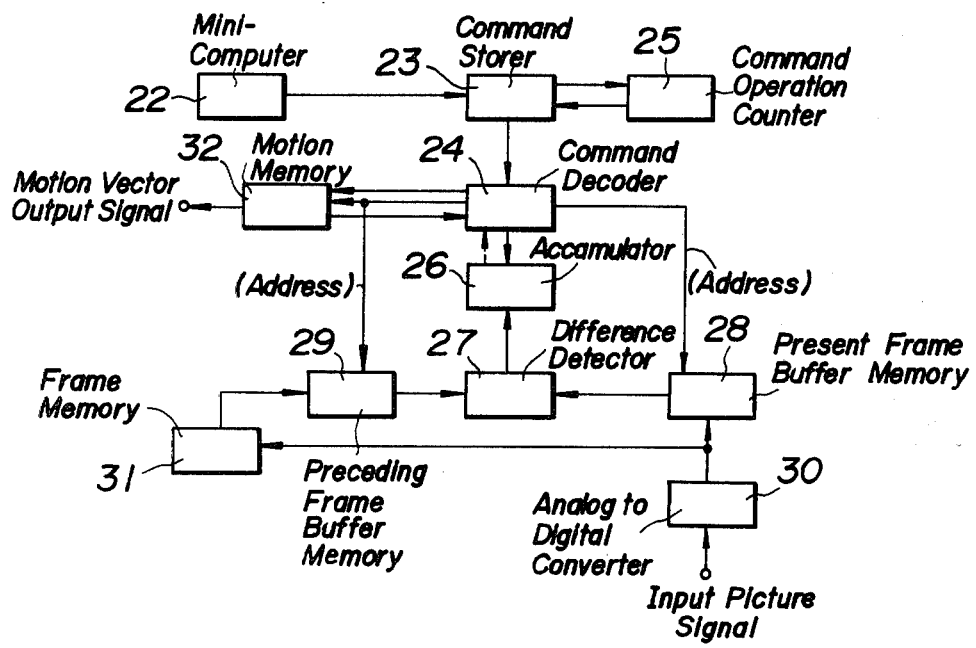
FIG. 12 is a block diagram showing an example of an detailed configuration of the apparatus shown in FIG. 10.

A more detailed configuration of the above mentioned interframe coding apparatus is shown in FIG. 12. In FIG. 12, an input picture signal is applied to a present frame buffer memory 28 and a frame memory 31 through an analog to digital converter 30. A one frame delayed picture signal derived from the frame memory 31 is applied to a preceding frame buffer memory 29. Both of output picture signals of those present frame and preceding frame buffer memories 28 and 29 are applied to a difference detector 27, so as to obtain an absolute value of a difference of picture signal levels. This absolute value of the signal level difference is accumulated in an accumulator 26.

On the other hand, both of memory addresses of those present frame and preceding frame buffer memories 28 and 29 are controlled by a command stored in a command storer 23. These memory addresses are applied to those buffer memories 28 and 29, so as to obtain the correlations of respective picture elements corresponding to each other in a difference detector 27.

These memory addresses of those buffer memories 28 and 29 are shifted successively under the control of the above command, so as to shift the positions of picture elements to be examined regarding the correlation in the attended blocks. As a result, the correlations obtained regarding respective blocks are accumulated in the accumulator 26.

The above procedure for obtaining the correlation is repeated on the strength of various block-shifts offered by varying the aforesaid memory addresses, so as to obtain the possibly stronger correlation.

As a result thereof, the memory addresses, according to which the highest correlation can be obtained, can be detected as the memory address corresponding to the motion vector, so that those memory addresses are stored in a motion memory 32. Thereafter, at the next frame period, the memory address to be applied to the preceding frame buffer memory 29 is decided by referring to the above memory addresses read out from the motion memory 32, so as to repeat the above procedure for obtaining the strongest correlation. As a result, motion vectors representing the motion of the moving picture are stored successively.

The aforesaid command for controlling the above procedure is stored in the command storer 23 which is loaded by a mini-computer 22.

Figure 13:
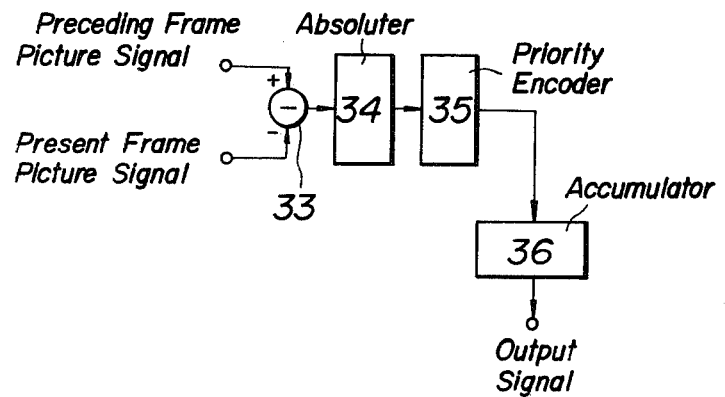
FIG. 13 is a block diagram showing another example of the detached configuration of the apparatus shown in FIG. 10.

An example of the circuit arrangement for detecting the motion vector which is improved according to the present invention so as to be employed in the above mentioned interframe coding apparatus is shown in FIG. 13. In FIG. 13, a present frame picture signal and a preceding frame picture signal are applied from respective input terminals to a subtractor 33 is applied to an absoluter 34 so as to obtain an absolute value thereof as well known. The obtained absolute value of the interframe differential picture signal is applied to a priority encoder 35. The priority encoder 35 is a kind of digital circuit device for performing the code conversion, for instance, from a hexadecimal code to a binary code, an integrated circuit product of which is marketted already. Accordingly, in this priority encoder 35, a coded signal representing the above absolute value of the interframe differential picture signal is converted to a binary coded signal so as to form a signal presenting the word length, namely, the number of figure of the binary coded signal. This signal presenting the word length of the binary coded signal is accumulated at every blocks to be examined regarding the correlation in an accumulator 36, so as to obtain the values of correlation of those picture frames successively as accumulated output signals which are derived from an output terminal.

Apparently from the explained above, in the motion vector detection apparatus improved according to the present invention, the whole motion of picture contents in every blocks of the picture frame can be detected correctly. Particularly, in the case of coding the interframe differential picture signal, the motion of the picture can be detected exactly and easily by detecting the amount of shift between every blocks so as to find the minimum amount of information represented by the word length of the binary coded picture signal.

Nextly, such a further improved method for detecting the motion vector will be explained hereinafter that, even if the motion of picture contents is discontinuous, the motion vector can be detected smoothly.

The conventionally improved method for detecting the motion vector, as mentioned early, is very effective in practice, because the motion vector can be detected correctly even on the strength of a few reference vectors. However, on the other hand, although such an exteme effect as mentioned above can be obtained for a continuous motion in such a moving picture as an ordinary television picture, the calculation for obtaining the interframe correlation, that is, the detection of motion can not be performed smoothly with respect to such a discontinuous motion as in a film program television picture. A moving picture reproduced from a cinema film consists of 24 frames per second, whilst a television picture consists of 30 frames, namely 60 fields per second, so that the so-called two-three pull down system is adopted for adjusting the difference of the number of frames per unit time. In the two-three pull down system, once at every five fields of the television picture the same frame of the cinema film is twice televised repeatedly. As a result, with respect to the twice repeated frame, the value of interframe correlation becomes zero, so that the motion vector can not be detected. Consequently, the process of the detection of motion vector, in which process the calculation of correlation is performed by referring to the result of the immediately preceding calculation, is interrupted, so that the detection of the motion vector cannot be effected smoothly.

For the purpose of removing the above difficulty, in the aforesaid further improved method for detecting the motion vector according to the present invention, a group of plural blocks having shifted successively are settled in every frames of a television picture, and further, with respect to each of those plural blocks, another group of plural blocks corresponding thereto respectively and having respective positions shifted in various directions being different from each other is settled in the immediately preceding frame, and one of plural blocks belonging to the latter group, which one has the highest correlation to each of plural blocks belonging to the former group is detected, so as to obtain a motion vector of the television picture.

The above mentioned procedure for detecting the motion vector is just the same to that described regarding the previously explained embodiment of the present invention as a part of the feature thereof.

However, with respect to the vector amount of the shift of the reference blocks, in the previous embodiment, the motion vector regarding the respective block, which has been detected by the immediately preceding calculation of correlation, is employed, whilst, in the above further improved method, a motion vector detected by the calculation of correlation regarding rest blocks being adjacent to the respective block own self in the same picture frame is employed, as an essential difference from the previously described method.

As mentioned above, in this further improved method for detecting the motion vector asymptotically, a moton vector detected already by the previous calculation of correlation with respect to rest blocks being possibly adjacent to the respective reference block own self is employed preferably in the shift thereof. Accordingly, the motion vector to be employed in the above block shift should have been detected prior to the required calculation of correlation, so that, with respect to the ordinarily scanned television picture, that is, in the case that the order of the picture block to be examined regarding the correlation coincides with the order or the direction of the ordinary scanning of the picture, the motion vector detected already regarding the rest block being adjacent, for instance, to the left side or the upper side of the respective reference block is employed in the block shift.

Moreover, the target body moves mostly in the horizontal direction in such a moving picture as the television picture, so that a motion vector resembling the more closely to the correct motion vector regarding the respective reference block can be detected by employing the motion vector detected already regarding the adjacent block either preferably on the upper side or on the lower side thereof rather than on the left side thereof.

Figure 14:
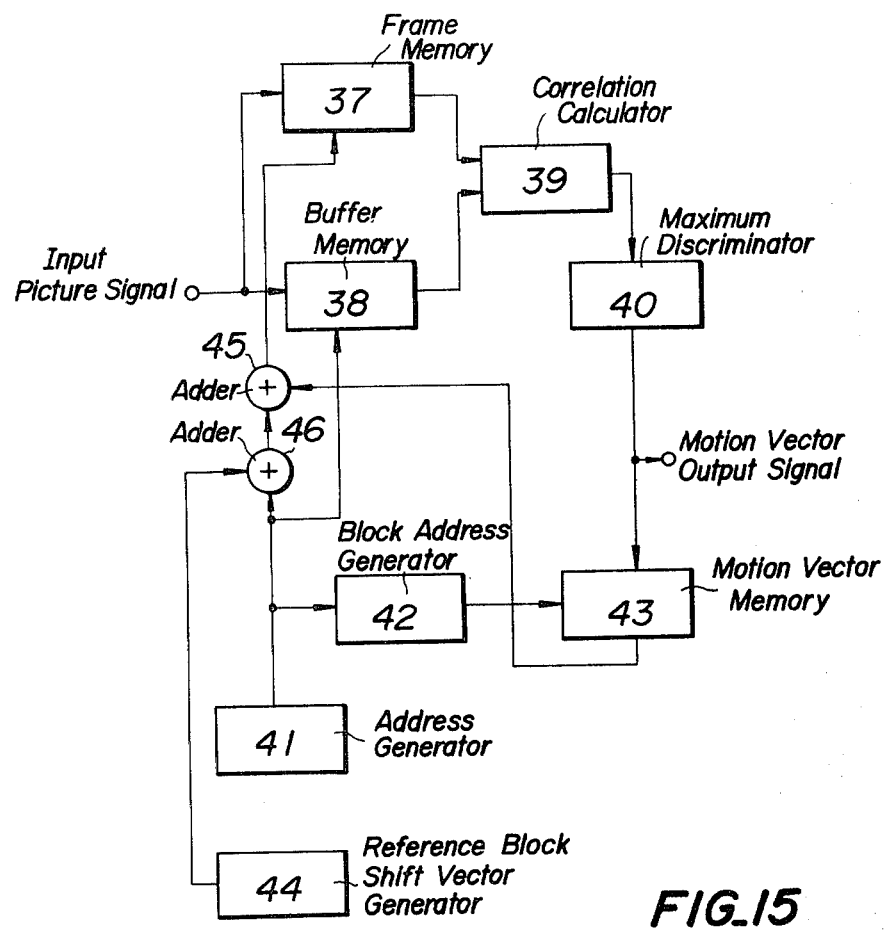
FIG. 14 is a block diagram showing still another example of the detailed configuration of the apparatus shown in FIG. 10.
Figure 15:
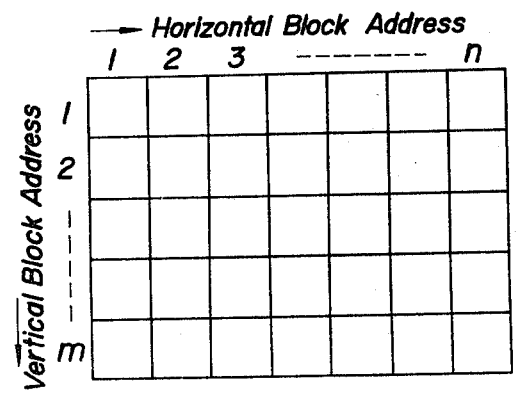
FIG. 15 is a diagram showing an example of an arrangement of blocks in a picture frame.

Nextly, an example of a circuit arrangement of a motion vector detection apparatus in which the motion vector is detected asymptotically according to the present invention as explained above is shown in FIG. 14, and further an example of a matrix arrangement of plural blocks dividing the picture frame is shown in FIG. 15, so as to explain the operation of the above mentioned further improved motion vector detecting method by referring to these drawings.

In the motion vector detection apparatus shown in FIG. 14, an input picture signal is, firstly, written in a frame memory 37 and a buffer memory 38 respectively. These write-in procedures of the picture signal are performed according to the so-called sequential address system in which successive picture element signals are written in successive memory addresses in order, so that the positions of respective picture elements in the picture frame and the memory addresses thereof coincides with each other. Nextly, the read-out procedures of those picture element signals from those memories are controlled by respective address signals applied from an address generator 41 to those memories 37, 38. At this time, the buffer memory 38 for memorizing the present frame picture signal is applied with the address signal directly from the address generator 41, whilst the frame memory 37 for memorizing the preceding frame picture signal is applied with the address signal from the address generator 41 as follows.

That is, the address signal derived the address generator 41 and a reference block shift vector derived from a reference block shift vector generator 44 are added to each other in an adder 46, and further the output signal of the adder 46 and the motion vector signal regarding the rest block being adjacent to the upper side of the reference block, which has been detected by the immediately preceding calculation of correlation and is derived from a motion vector memory 43, are added to each other in an adder 45, the output thereof being applied to the frame memory 37 as the address signal for reading out the preceding frame picture signal. Accordingly, the last address signal indicates a memory address shifted from the address applied to the buffer memory 38 by an amount corresponding to that by which te reference block shift vector derived from the generator 44 is shifted in response to the motion vector derived from the generator 43.

The motion vector memory 43 is provided with a memory capacity corresponding to one row of the matrix arrangement of blocks shown in FIG. 15. Such a memory address of each row is called by a block address. The block address indicating a rest row preceding immediately the reference row to which the reference picture block to be examined regarding the detection of motion vector, which reference block in the present frame is stored in the buffer memory 38, is applied from the block address generator 42 to the motion vector memory 43, so as to write the motion vector signal corresponding thereto and selected out of the output motion vector signals into the motion vector memory 43.

The present frame picture signal and the preceding frame picture signal, which are read out from the buffer memory 38 and the frame memory 37 respectively under the control of the address signals indicating the respective addresses of the respective blocks to be examined regarding the correlation, are applied to a correlation calculator 39, so as to calculate the correlation between respective blocks, for instance, according to the square correlation calculation performed by referring to the aforesaid equation. The correlations obtained successively as the result of the above calculation are applied to a maximum discriminator 40, so as to detect the motion vector regarding respective blocks based on the position of the rest block regarding which the strongest correlation can be obtained.

In addition thereto, although, in the above further improved method, the motion vector regarding the reference block to be examined regarding the correlation is detected by referring to the motion vector detected previously regarding the rest block being adjacent to the upper side of the reference block, the previously detected motion vector does not exist with respect to the blocks belonging to the top row of the matrix arrangement of blocks shown in FIG. 15, so that the above further improved method can not be applied to those blocks belonging to the top row.

Consequently, in the case that the above further improved method is applied to those blocks belonging to the top row of the matrix arrangement, it is preferable either it is assumed that the previously detected motion vector to be referred to is a zero vector, or, the motion vector regarding those blocks belonging to the top row is detected by referring to the motion vector detected previously regarding the block corresponding thereto in the immediately preceding picture frame. Although it is natural that the latter is more preferable, in any case it is impossible regarding the blocks belonging to the top row or the second row of the matrix arrangement shown in FIG. 15 that such a sufficient number of rest blocks surrounding the reference block to be examined with respect to the correlation, particularly, being adjacent the upper side thereof is settled as occasion demands as regarding the blocks disposed in the central portion of the matrix arrangement, so as to detect the possibly correct motion vector.

However, the influence caused by the above difficulty of incorrectness affects the whole area of the picture frame insignificantly, so that it can be neglected in practice.

Apparently from explained above, according to the above further improved method, such a remarkable effect can be obtained that, even if the discontinuity of motion exists in such a moving picture as the televised cinema film picture, the substantially correct motion vector similar as in the continuously moving picture can be detected smoothly.

Nextly, a motion-compensated interframe coding system which is still further improved in such a manner according to the present invention that the coding error based on the error of the detection of motion vector which error is caused by the erroneously detected motion of the picture, which motion is predicted by the compensation of the previous motion.

As mentioned early, the various methods for detecting the motion of the picture reproduced from the picture signal have been investigated. However, those conventional methods, as well as the methods improved according to the present invention as mentioned above, have such a still further defect as follows, although these methods can be recognized to belong to a sole kind of these methods being effective in practice.

That is, in the above kind of methods for detecting the motion of the picture, the error of detection is caused frequently in the case that moving parts and still parts are mixed together in the same one of blocks dividing the picture frame, or, the motion detected regarding the picture having a poor signal to noise ratio is contaminated by the noise, although the probability thereof is not so large.

Accordingly, in the case that the coded picture signal, particularly, the motion-compensated interframe differential coded picture signal formed by referring to the motion vector obtained from the above erroneous result of the detection of motion is transmitted, and especially in the case that the efficiency of transmission of the coded picture signal is intended to be increased by such a way that the coded interframe differential picture signal formed of the difference between the preceding frame picture signal which can be reproduced at the receiving end and the predicted present frame picture signal which is formed by compensating the preceding frame picture signal by referring to the predicted motion of the picture is transmitted, so as to reduce the amount of coded signal to be transmitted, the pedicted present frame picture signal is contaminated by the prediction error, since the portion thereof, regarding which portion the erroneous motion has been detected, is applied with the erroneous compensation.

On the other hand, in the case the coded interframe differential picture signal is transmitted, the minute interframe differential components based on the noise are omitted, so as to increase the efficiency of transmission. Accordingly, so long as the sufficiently low threshold level can exceed the level of the above minute interframe differential components, the efficiency of transmission may be simply lowered by the increased amount of coded signals to be transmitted, but the quality of the coded picture signal to be transmitted is no longer affected by the erroneous detection of motion.

On the contrary, in the case that the threshold level required for transmitting the interframe differential coded picture signal is settled comparatively high, minute interframe differential components caused by the slow motion of the picture are not transmitted at all, whilst the comparatively high interframe differential components caused by the quick motion of the picture only is transmitted. As a result, when the magnitude of motion of the picture exceeds that which corresponds to the threshold level, the motion appears abruptly in the reproduced picture, so that the contour of the reproduced picture becomes ununiform in response to the magnitude of the motion of the picture, and as the result the so-called spurious contour or the contouring effect is apt to appear in the reproduced picture. Accordingly, if the above erroneous detection of motion is carried out, the error is induced also into the interframe differential picture signal based on the interframe motion of the picture, so that the above spurious contour of the picture is emphasized by the irregular motion of the spurious contour of the picture in response to the erroneously detected motion of the picture, and as the result, the quality of the reproduced picture is extremely deteriorated.

Moreover, in the case also that the noise in the produced picture is reduced by connecting the noise with the motion of the picture, the spurious contour caused by the above noise reduction, similarly as mentioned above, moves irregularly in response to the erroneously detected motion of the picture, the quality of the reproduced picture is rather deteriorated. By the way, the most significant difficulty of the deteriorated picture quality which is caused by the erroneous detection of the picture is that the spurious irregular motion caused by the erroneous detection of moton appears in an originally still portion of the picture frame.

The feature of a motion detection error compensating method improved by removing the above difficulties according to the present invention is as follows.

That is, in forming a predicted picture signal resembling the present frame picture signal, based on the motion which is detected previously regarding the preceding frame picture signal, either the preceding frame picture signal or the picture signal formed by compensating the preceding frame picture signal in response to the motion detected previously is employed selectively as the above predicted picture signal by referring to the result of the comparison between the above either one employed picture signal and the present frame picture signal, so as to correct the error of the predicted picture signal which error is caused by the erroneously detected motion.

Furthermore, in the case that the above selective employment of the predicted picture signal is effected, it is necessary to indicate clearly which picture signal is employed as the predicted picture signal with respect to each picture elements in the picture frame. Accordingly, in transmitting the interframe differential coded picture signal, it is required, for instance, to transmit each of coded picture element signal together with a selecting signal consisting of one bit which indicates the result of the above selective employment of the predicted picture signal, and further it is considerable to involve the adaptive transmission of the one bit selecting signal in the improvement of the motion detection error compensating method according to the present invention.

Figure 16:
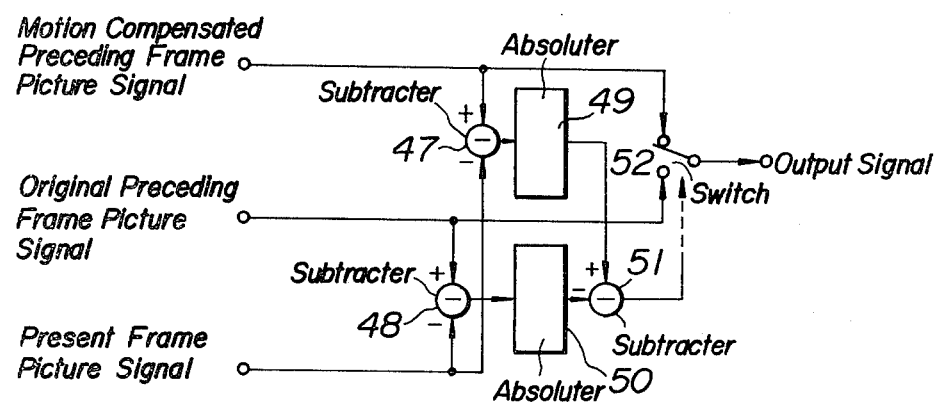
FIG. 16 is a block diagram showing a basic configuration of a motion vector detection error compensating apparatus according to the present invention.

Nextly, a basic circuit arrangement for effecting the aforesaid motion detection error compensating method improved according to the present invention is shown in FIG. 16. In FIG. 16, the preceding frame picture signal compensated regarding the motion and the present frame picture signal are applied to a subtracter 47, a differential picture signal between those picture signals derived therefrom being applied to an absoluter 49, so as to obtain an absolute value of the differential picture signal. On the other hand, the original preceding frame picture signal and the present frame picture signal are applied to another subtracter 48, another differential picture signal between those picture signals derived therefrom being applied to another absoluter 50, so as to obtain an absolute value of the other differential picture signal. Those absolute values are applied to still another subtracter, that is, a comparator 51, so as to compare those absolute values with each other. A switch 6 applied with the motion-compensated preceding frame picture signal and the original preceding frame picture signal is controlled by a result of comparison effected by the comparator 51, so as to take out either one of those preceding frame picture signals, which one has the smaller absolute value of the difference from the present frame picture signal, as a predicted present frame picture signal.

In the case that the above selection of the predicted present frame picture signal is employed, it is required for transmitting a coded interframe differential picture signal formed by employing the above predicted present frame picture signal to inform to the receiving end whether the motion-compensated or the original preceding frame picture signal is selected as the predicted present frame picture signal, and further it is required for transmitting the information concerning the above selection to adapt at least one bit to each coded picture element signal, accompanied with the corresponding decrease of the efficiency of transmission.

Figure 17:
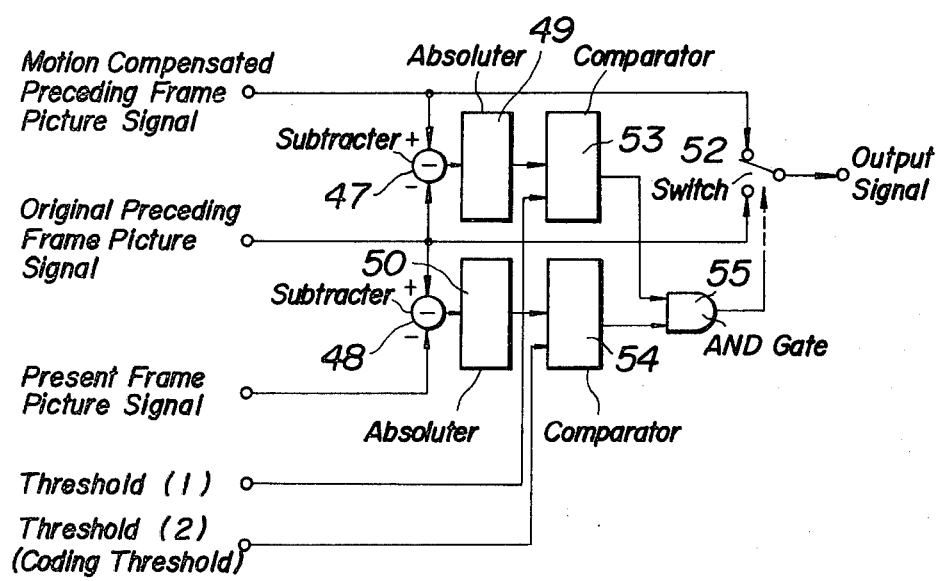
FIG. 17 is a block diagram showing another basic configuration of the motion vector detection error compensating apparatus according to the present invention.

Nextly, another basic circuit arrangement for effecting the motion detection error compensating method according to the present invention in which the above decrease of the transmission efficiency is prevented is shown in FIG. 17. In FIG. 17, the motion-compensated and the original preceding frame picture signals are applied to the subtracter 47, the differential picture signal between those picture signals derived therefrom being applied to the absoluter 49, so as to obtain the absolute value of the differential picture signal. This absolute value and an appropriately settled threshold level (1) are compared with each other in a comparator 53, so as to obtain a high logic level output signal as a result of comparison, only when the absolute value does not exceed the threshold level (1), that is, the differential picture signal is small because of the slow motion of the picture. On the other hand, the preceding frame and the present frame picture signals are applied to the subtracter 48, a so-called interframe differential picture signal derived therefrom being applied to the absoluter 50, so as to obtain an absolute value of the interframe differential picture signal. This absolute value is compared in another comparator 54 with another threshold level (2) which is appropriately settled for effecting the transmission of the coded interframe differential picture signal only when the picture signal presents a significant difference between two adjacent frame, so as to obtain a high logic level output signal as a result of comparison only when the absolute value of the interframe differential picture signal does not exceed the threshold level (2) settled for coding, that is, the picture signal does not present any significant difference between two adjacent frames.

The above results of comparison derived from the comparators 53 and 54 are applied to an AND gate 55, an output signal thereof being employed in controlling the switch 52, to two input terminals of which the motion-compensated and the original preceding frame picture signals are applied, so as to derive the motion-compensated preceding frame picture signal in an ordinary state from an output terminal thereof. Only when two input signals of the AND gate 55 present the high logic levels at the same time, and accordingly the picture signal does not present any significant difference between two adjacent frames, because the picture signal is varied scarcely by the motion-compensation, the connection state of the switch 52 is changed, so as to derive the original preceding frame picture signal as the predicted present frame picture signal from the output terminal thereof in order to transmit the coded interframe differential picture signal formed of this predicted present frame picture signal.

In the case that the transmission of the coded interframe differential picture signal is performed by employing the predicted picture signal which is formed selectively as mentioned above, in the receiving end also, when the received interframe differential picture signal is discriminated to be zero, it can be decided that the predicted picture signal employed in forming this received interframe differential picture signal is the original preceding frame picture signal. Accordingly, it is not required any longer to transmit the aforesaid information regarding the selection of the predicted picture signal which is required according to the basic circuit arrangement shown in FIG. 16, so that the efficiency of transmission can be increased according to the improved basic circuit arrangement shown in FIG. 17 higher than that according to FIG. 16.

By the way, the reason of the employment of the original preceding frame picture signal for the predicted picture signal in the case that the variation caused by the motion-compensation of the picture signal is little, and accordingly the absolute value of the difference does not exceed the threshold level (1) is as follows. That is, when the motion of the picture is so slow that the variation caused by the motion-compensation of the picture signal is little, or, the moving parts of the picture frame are small, it is feared that a significant error of motion detection, and accordingly the deterioration of the picture quality which is caused by the spurious contour formed by the erroneously detected motion, so that the motion compensation should not be effected in such a case.

As mentoned above, in the basic circuit arrangement shown in FIG. 17, the existence of the motion-compensation in the received predicted picture signal can be decided only by discriminating the received interframe differential picture signal, so that the algorism for employing the original preceding frame picture signal as the predicted present frame picture signal in the receiving end is "When the received interframe differential picture signal is zero, as well as the difference between before and after the motion-compensation of the preceding frame picture signal is lower than the predetermined threshold level, the original preceding frame picture signal is employed as the predicted present frame picture signal".

So long as predetermined threshold level is the same to that in the sending end, it may be fixed perfectly at a constant level, or, may be varied in response to the picture contents, for instance, at a rate of once at a frame.

Figure 18:
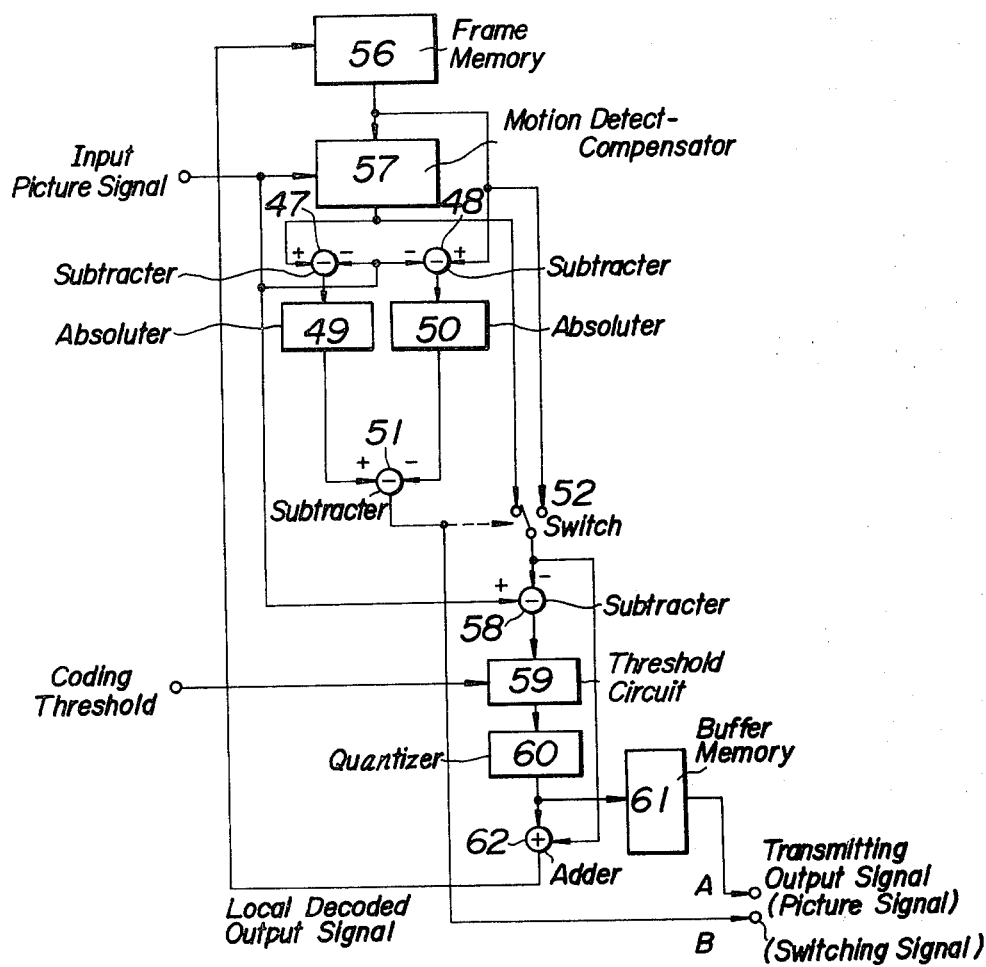
FIG. 18 is a block diagram showing an example of detailed configuration of a sending end of the motion-compensated interframe coding system according to the present invention.
Figure 19:
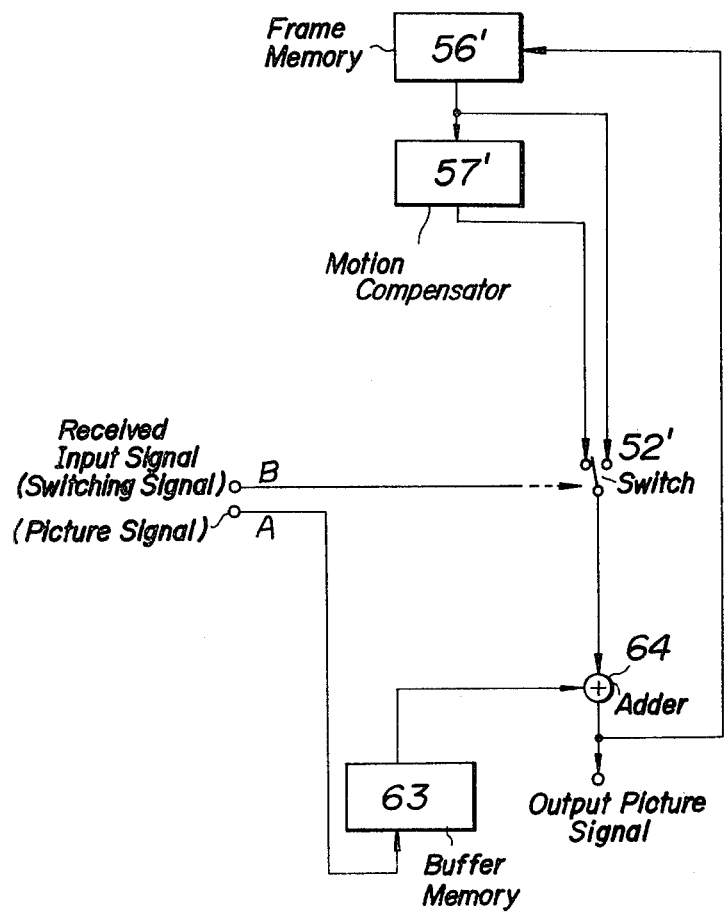
FIG. 19 is a block diagram showing an example of detailed configuration of a receiving end of the motion-compensated interframe coding system according to the present invention.
Figure 20:
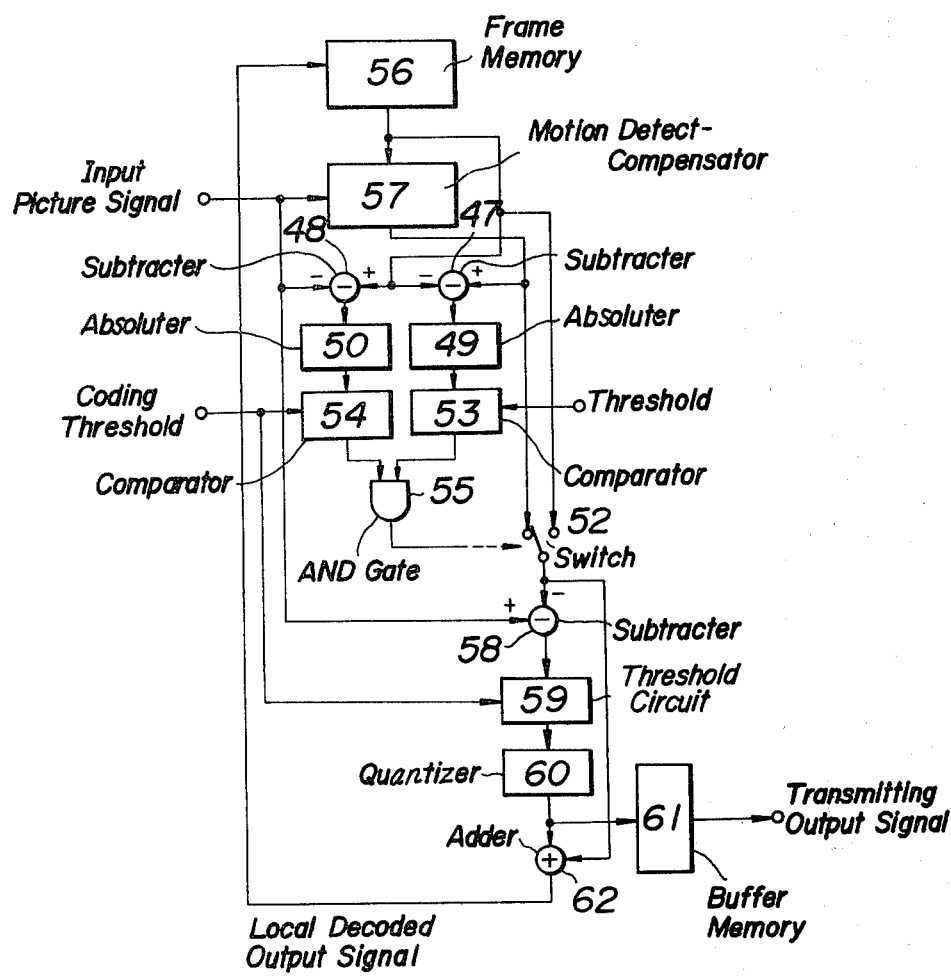
FIG. 20 is a block diagram showing another example of detailed configuration of the sending end of the motion-compensated interframe coding system according to the present invention.
Figure 21:
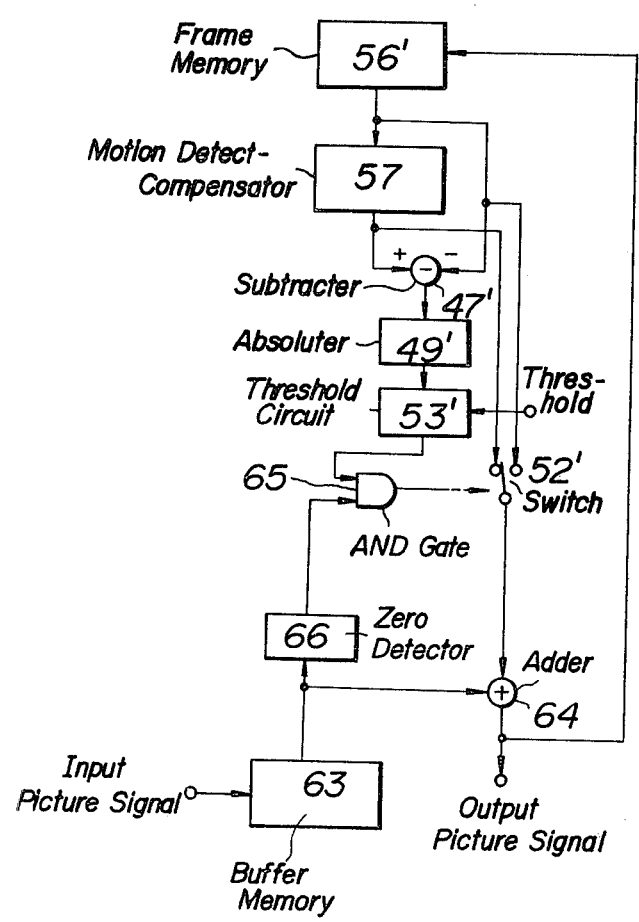
FIG. 21 is a block diagram showing another example of detailed configuration of the receiving end of the motion-compensated interframe coding system according to the present invention.

Nextly, examples of circuit arrangements in the sending and the receiving ends in the case that the transmission of the coded interframe differential picture signal is performed under the application of the aforesaid motion detection error compensating method according to the present invention are shown in FIGS. 18 and 19 respectively by referring to the basic circuit arrangement shown in FIG. 16 and further in FIGS. 20 and 21 respectively by referring to the basic circuit arrangement shown in FIG. 17.

In a sending circuit arrangement shown in FIG. 16 for the transmission of the coded interframe differential picture signal, a transmitting interframe differential picture signal derived from a quantizer 60 as mentioned later and a picture signal derived selectively from the switch 52 as mentioned later also are applied to an adder 62. An output picture signal of the adder 62, that is, a local decoder output picture signal is stored in a frame memory 56 as the present frame picture signal which can be reproduced in the same manner in the receiving end also. A one frame delayed picture signal derived from the memory 56 corresponds to the original preceding frame picture signal in the basic circuit arrangement shown in FIG. 16. This one frame delayed picture signal and the input picture signal are applied to a motion detect-compensator 57. A compensated picture signal derived from the motion detect-compensator 57 corresponds to the motion-compensated preceding frame picture signal in the basic circuit arrangement shown in FIG. 16. Further, the input picture signal corresponds to the present frame picture signal in the basic circuit arrangement shown in FIG. 16.

A predicted picture signal, which is formed by selecting those aforesaid three corresponding picture signals, is derived from the switch 52, as well as a switch controlling signal derived from the subtracter 51 is transmitted as an information B for forming selectively the predicted picture signal at the receiving end. Further, the predicted picture signal derived from the switch 52 and the input picture signal are applied to a subtracter 58, an output signal thereof being applied to a threshold circuit 59 as the so-called interframe differential picture signal, so as to be compared with the coding threshold level. The interframe differential picture signal which is derived from the threshold circuit 59 only when a significant difference exists between two adjacent frames is coded in a quantizer 60 and then transmitted through a buffer memory 61 as an information A.

On the other hand, in a receiving circuit arrangement shown in FIG. 19 for the transmission of the coded interframe differential picture signal, an output picture signal formed as mentioned later is stored in a frame memory 56' as the present frame picture signal in the basic circuit arrangement shown in FIG. 16, a one frame delayed picture signal derived therefrom being applied to an input terminal of a switch 52' as the original preceding frame picture signal in the basic circuit arrangement shown in FIG. 16, as well as a compensated picture signal derived from a motion compensator 57', which is applied with the above one frame delayed picture signal, is applied to another input terminal of the switch 52' as the motion-compensated preceding frame picture signal in the basic circuit arrangement shown in FIG. 16. In such a state, the received information B, which is used as the switching signal for forming selectively the predicted picture signal in the sending end, is applied to a switch 52' for controlling it in synchronism with the switching in the sending end, so as to derive the same preceding frame picture signal as that selected in the sending end. This derived preceding frame picture signal and the received information B consisting of the interframe differential picture signal, which is derived through a buffer memory 63, are applied to an adder 64, an output signal thereof being taken out as the reproduced picture signal.

Nextly, a sending circuit arrangement shown in FIG. 20 for the transmission of the coded interframe differential picture signal is formed just the same as that shown in FIG. 18, except that a section for forming the predicted picture signal selectively is arranged just the same as in the basic circuit arrangement shown in FIG. 17. Accordingly, this sending circuit arrangement operates just the same as that shown in FIG. 18, except that the control of the switch 52 for switching the motion-compensated and the original preceding frame picture signals to each other is performed just the same as in the basic circuit arrangement shown in FIG. 17.

On the other hand, a receiving circuit arrangement shown in FIG. 21 for the transmission of the coded interframe differential picture signal is arranged to operate according to the algorism in the receiving end, which has been mentioned regarding the basic circuit arrangement shown in FIG. 17. In this receiving circuit arrangement, similarly as in that shown in FIG. 19, a selected picture signal derived from the switch 52' and the received interframe differential picture signal, which is derived through the buffer memory 63, are applied to an adder 64, a reproduced present frame picture signal derived therefrom being applied to the frame memory 56'. The one frame delayed picture signal derived from the frame memory 56' as the original preceding frame picture signal in the basic circuit arrangement shown in FIG. 17 is applied to the input terminal of the switch 52', as well as the compensated picture signal derived from the motion compensator 57', which is applied with the above one frame delayed picture signal, is applied to the other input terminal of the switch 52' as the motion-compensated preceding frame picture signal in the basic circuit arrangement shown in FIG. 17.

With respect to the control of the switch 52', an output signal of a comparator 53', in which an absolute value of a difference between a motion-compensated and an original preceding frame picture signals, and a threshold level are compared with each other, and a high logic level output signal of a zero detector 66, which is obtained only when an input interframe differential picture signal derived from a buffer memory 63 is zero, are applied to an AND gete 65, an output signal thereof being employed in controlling the switch 52' as follows.

That is, under such a decision that, when the interframe differential picture signal is zero, the difference between two adjacent frames of the picture signal, which is caused by the motion of the picture, is small, and accordingly the variation caused by the motion-compensation of the preceding frame picture signal is little, and consequently the original preceding frame picture signal has been adopted as the predicted picture signal in the sending end, only when it is detected that the interframe differential picture signal is zero, the original preceding frame picture signal is taken out as the predicted picture signal, since the above zero-detection can be regarded as a switching control information.

Figure 22:
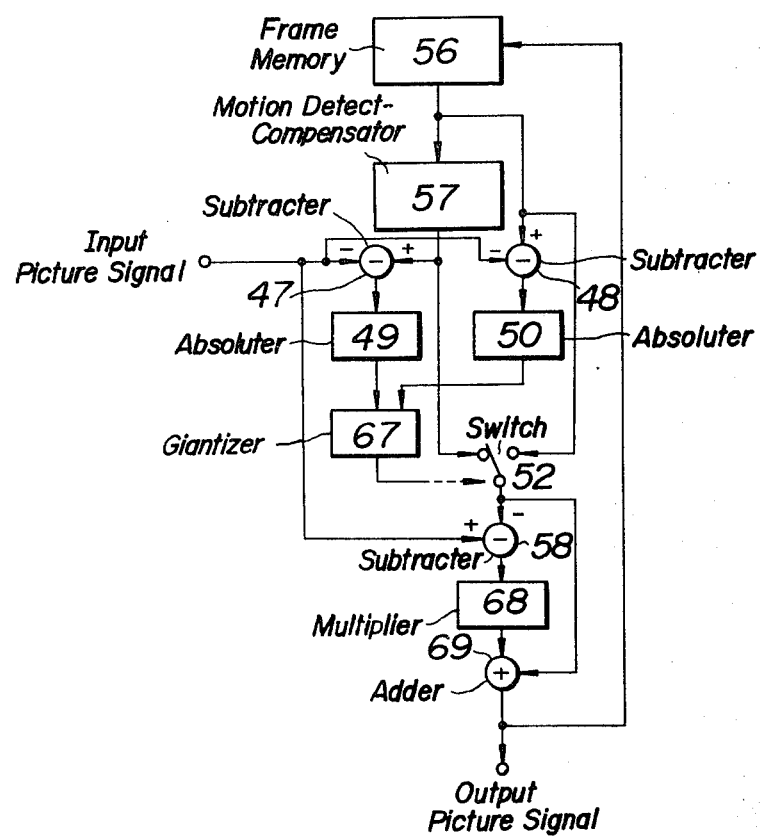
FIG. 22 is a block diagram showing still another example of detailed configuration of the sending end of the motion-compensated interframe coding system according to the present invention.

Nextly, a circuit arrangement in which the above motion detection error compensation is applied to the noise reduction of the coded picture signal according to the motion compensation is shown in FIG. 22.

In the above motion-compensated noise reduction of the picture signal, for reducing the noise of the picture signal, for instance, by feeding back positively a one frame delayed picture signal derived from a frame memory to an input side of the frame memory at an appropriate feedback level ratio, the above one frame delayed picture signal is compensated in response to the motion of the picture which is detected by comparing the input and the output picture signals of the frame memory.

Figure 1:
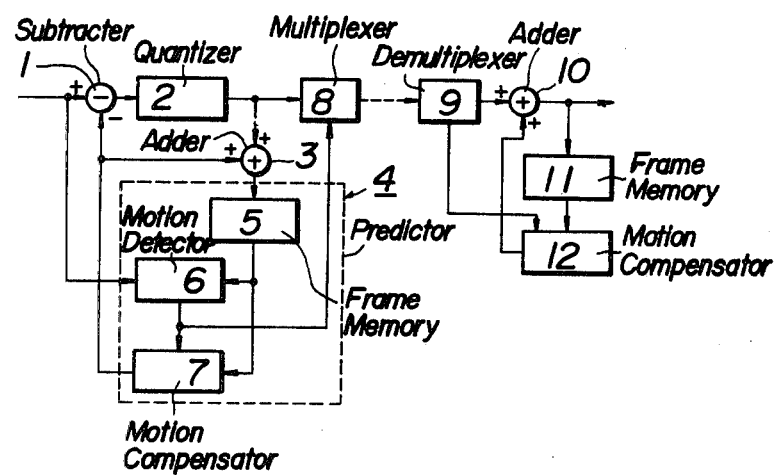
FIG. 1 is a block diagram showing a circuit configuration of an ordinary motion-compensated interframe coding system as mentioned above.
Figure 2:
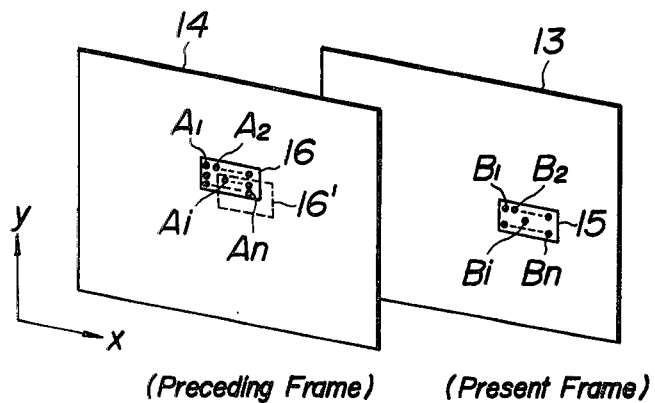
FIG. 2 is a perspective view showing a principle of an ordinary method for detecting a motion vector as mentioned above.
Figure 3:
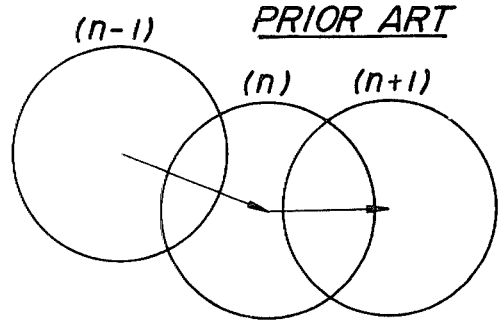
FIG. 3 is a diagram showing an example of a motion of a television picture as mentioned above.
Figure 4:
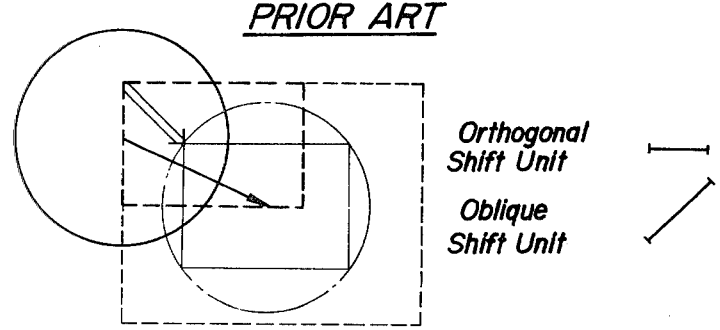
FIG. 4 is a diagram showing an example of a relation between two picture frames in the method shown in FIG. 2 as mentioned above.
Figure 5:
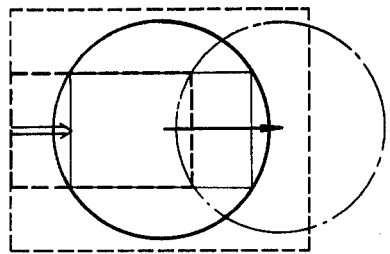
FIG. 5 is a diagram showing another example of the relation between two picture frames in the method shown in FIG. 2 as mentioned above.
Figure 6:
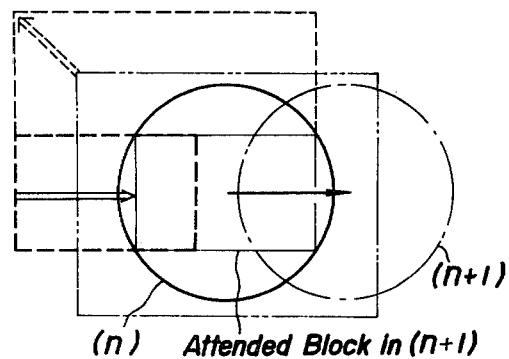
FIG. 6 is a diagram showing an example of a relation between two picture frames in an improved method for detecting a motion vector as mentioned above.
Figure 7:
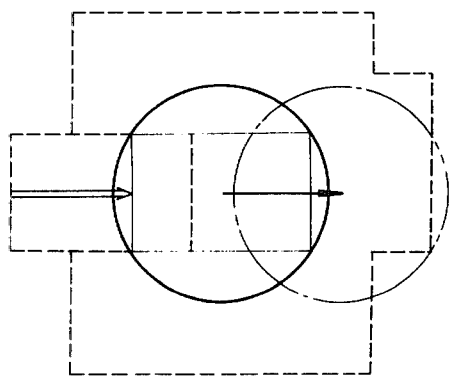
FIG. 7 is a diagram showing still another example of the relation between two picture frames in the method shown in FIG. 2 as mentioned above.
Figure 8:
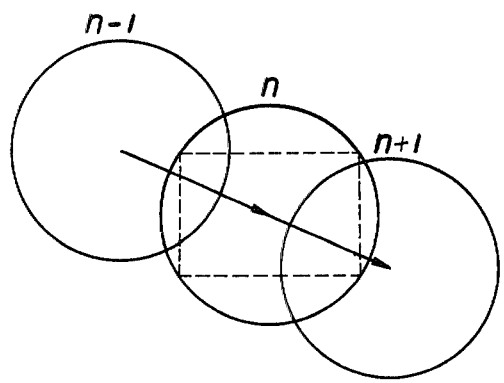
FIG. 8 is a diagram showing further another example of the relation between two picture frames in the method shown in FIG. 2 as mentioned above.
Figure 9:
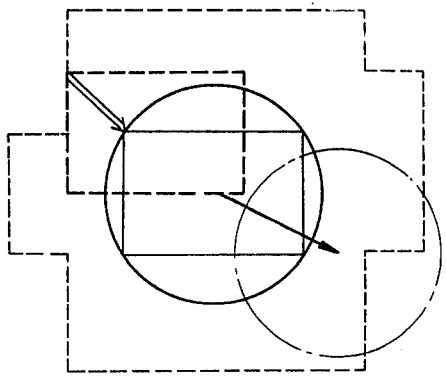
FIG. 9 is a diagram showing still further another example of the relation between two picture frames in the method shown in FIG. 2 as mentioned above.
Figure 10:
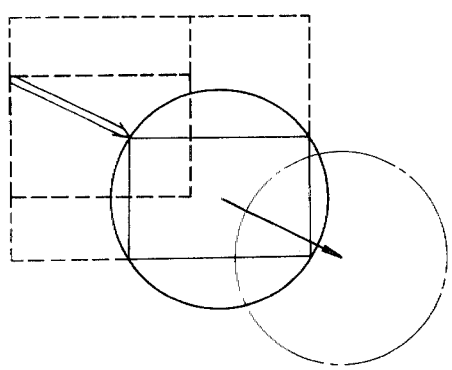
FIG. 10 is a diagram showing another example of the relation between two picture frames in the improved method shown in FIG. 6 as mentioned above.

In a motion-compensated noise reduction apparatus shown in FIG. 7, an output picture signal is applied to the frame memory 56 similarly as in the sending circuit arrangement shown in FIG. 18, the one frame delayed picture signal derived therefrom being applied to the input terminal of the switch 52 as the original preceding frame picture signal in the basic circuit arrangement shown in FIG. 16. At the same time, the motion-compensated picture signal, which is derived from the motion detect-compensator 57 applied with the above one frame delayed picture signal, is applied to the other input terminal of the switch 52. Further, these original and the motion-compensated preceding frame picture signals and the input picture signal regarded as the present frame picture signal in the basic circuit arrangement shown in FIG. 16 are compared with each other in the same way as in the above basic circuit arrangement shown in FIG. 16. Under the control of the switch 52 according to the result of the above comparison, the motion compensation of the picture signal is effected in response to the magnitude of the motion of the picture. Then, either the motion-compensated or the original preceding frame picture signal is taken out as the output picture signal of this motion-compensated noise reduction apparatus. In addition thereto, the above switched preceding frame picture signal and the input picture signal are applied to the subtracter 58, so as to form the interframe differential picture signal. This interframe differential picture signal is multiplied at an appropriate level ratio by a multiplier 68, and then added to the above switched preceding frame picture signal in an adder 69.

Consequently, in this motion-compensated noise reduction apparatus shown in FIG. 22, the motion compensation applied to the picture signal to be fed back positively to the input side of the frame memory is not effected when the motion of the picture is small, so that the erroneous operation of the motion-compensated noise reduction apparatus, which operation is based on the erroneous detection of the motion of the picture, can be prevented.

Apparently from explained above, in the above mentioned noise reduction according to the present invention, even if the coding threshold is settled at such a high level that the efficiency of transmission is increased remarkably in the transmission of the coded interframe differential picture signal, the occurrence of the spurious contour of the picture and the deterioration of the picture quality, which is caused by the increase of the spurious contour, can be prevented, so that the sufficiently high efficiency of transmission can be attained, as well as the effect of noise reduction can be increased sufficiently.

Nextly, an interframe coding system improved according to the present invention so as to reduce the bit rate of code transmission and to realize a high efficiency of transmission without any detrioration of the picture quality will be explained hereinafter.

In the above interframe coding system, the coding threshold level, which is used for descriminating the significant interframe differential picture signal to be coded, is settled in response to each picture element information.

Generally speaking, in the transmission of the coded picture signal to be improved for attaining the highly efficient transmission, the original picture signal is not coded, but only the difference between two adjacent frames of the picture, particularly, the significant difference from which the noise component is removed, is coded.

The above mentioned significant interframe differential picture signal is increased in response to the magnitude of the motion of the picture, so that the rate per unit time of the appearance of those significant interframe differential picture element signals is varied in response to the motion of the picture, and as a result the efficiency of transmission is decreased by the variation of the density of coded signals to be transmitted.

Figure 23:
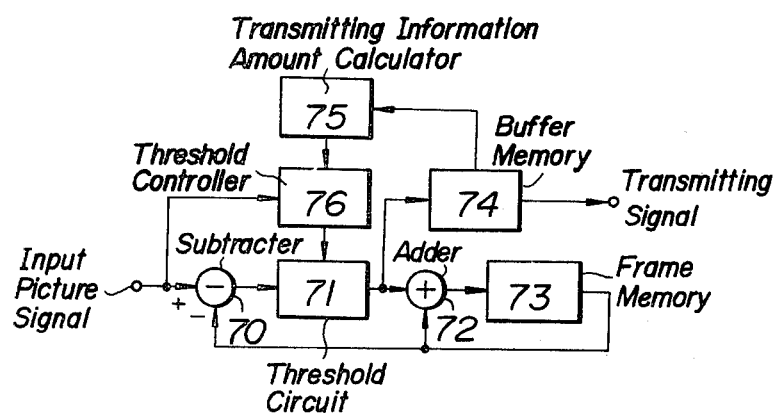
FIG. 23 is a block diagram showing another basic configuration of the motion-compensated interframe coding apparatus according to the present invention.

With respect to the prevention of the above decrease of the transmission efficiency, in the circuit arrangement shown in FIG. 23 according to the conventional interframe difference coding system, the threshold level, which indicates the lower limit of the level range of the significant interframe difference, is varied in response to th rate per unit time of the appearance of the significant interframe picture element signal, so as to maintain the above rate at a constant value. That is, in the conventional interframe difference coding circuit arrangement shown in FIG. 23, an input picture signal is applied to a subtracter 70, so as to form a differential signal from a preceding frame picture signal derived from a frame memory 73. This interframe differential picture signal is applied to a threshold circuit 71, so as to derive only those significant interframe differential picture element signals therefrom which have signal levels exceeding the threshold level derived from a threshold controller 76. Those significant interframe differential picture element signals are written in a buffer memory 74 and then read out therefrom at a constant speed, so as to be transmitted, as well as applied to an adder 72, so as to be added to the preceding frame picture element signals respectively. The significant present frame picture signal derived from the adder 72 is written in the frame memory 73 again for deriving the above preceding frame picture signal therefrom one frame period thereafter. The rate per unit time of the appearance of those significant interframe differential picture element signals written in the buffer memory 74 is varied in response to the magnitude of the motion of the picture reproduced from the input picture signal as mentioned above. Accordingly, in the case that the above rate per unit time of the appearance of the significant interframe differential picture element signal is increased in response to the quick motion of the picture, it is required to increase the memory capacity of the buffer memory 74, the speed of read out and further the speed of transmission. For suppressing those necessities, the amount of informations to be transmitted, which is indicated by the state of storage of the significant picture element signals in the buffer memory 74, is applied to a transmitting information amount calculator 75, the calculated result thereof being applied to a threshold controller 76, so as to vary the threshold level to be applied to the threshold circuit 71, preferably stepwise. As a result, when the above mentioned rate of the appearance of the significant interframe differential picture element signals is increased, the threshold level is raised, so as to lower the above rate of the appearance of significant interframe differential picture element signals, preferably stepwise per one frame period.

In the case that the picture reproduced from the picture signal contains the smooth contour and the gentle slop of the variation of signal level at the contour portion, the interframe differential signal level is low, so that, at the same smooth contour portion, a part which can be regarded to have a significant level difference and another part which can be regarded to have no significant level difference appear simultaneously based on the erroneous noise reduction, and further, in relation with the former portions only, the interframe differential picture element signals are transmitted, and those portions only of the above contour are shifted in the reproduced picture. As a result, the above contour in the reproduced picture frame becomes discontinuous, so as to deteriorate the reproduced picture quality, based on the spurious contour. Moreover, it is customary that, at the smooth contour portion of the picture, the interframe differential level is low, so that, if the threshold level is raised, for instance, to the same as that of the contour portions, the above spurious contour portions are increased with the extreme deterioration of the picture quality. In particular, similarly as in the conventional interframe difference coding system, if the threshold level is changed, for instance, at the rate of the picture frame period, a constant threshold level is applied to the whole area of the picture frame. Accordingly, when the whole picture frame is shifted at the equal speed, for instance, by the panning of the camera, the threshold level is settled at a high level under the control of the rate of the appearance of the significant interframe difference in the sharp contour portion, so that the above spurious contour is apt to appear at the smooth contour portions. Furthermore, as mentioned above, the interframe differencial level at the smooth contour portion is substantially lower than that at the sharp contour portion in general, so that, the change of the threshold level is not effected finely in response to the picture contents in one picture frame, but it is required to change the threshold level in response to whether smooth or sharp the contour of the picture is, namely, in response to the fineness of the picture contents reproduced from the picture signal.

In an interframe coding system, in which the above mentioned difficulties are removed according to the present invention, so as to prevent the appearance of the spurious contour in response to the picture contents, the coding threshold level can be settled in response to the higher frequency range component of the picture signal.

A basic whole circuit arrangement of the interframe coding apparatus in the above system is almost similar to the conventional circuit arrangement shown in FIG. 23. However, the above basic circuit arrangement has not only the similar faculty as that of the conventional circuit arrangement, so as to attain the settlement of the coding threshold level in the threshold controller 76 shown in FIG. 23 under the control of the transmitting information amount calculator 75, based on the information regarding the appearance rate of the significant picture element signal, but has such a faculty that the coding threshold level can be settled in response to the result of the detection of the picture fineness of the input picture signal, and accordingly, the coding threshold level can be changed precisely at every picture element in response to both of the appearance rate and the fineness of the significant picture element.

With respect to the detection of the fineness of the picture contents, it is possible regarding the analog picture signal that the high frequency components corresponding to the sharpness of the contour portion in the picture is extracted, for instance, by a highpass filter having an appropriate cutoff frequency, and then the fineness of the picture contents is detected by referring to the signal level of the above high frequency components, so as to vary the coding threshold level in response to the above signal level. However, it is preferable regarding the quantized picture signal required for the interframe coding system that the fineness of the picture contents is discriminated by referring to the sampling frequency employed in coding the picture signal.

Figure 24:
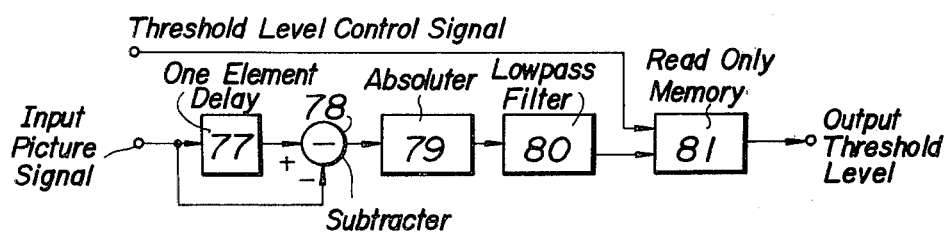
FIG. 24 is a block diagram showing still another basic configuration of the motion-compensated interframe coding apparatus according to the present invention.

An example of a circuit arrangement of the threshold controller 76, in which the fineness of the picture contents of the sampled picture signal can be discriminated as mentioned above, is shown in FIG. 24. In FIG. 24, a sampled picture signal derived from an input terminal is applied to a one element delay 77 which has an suitable delay time corresponding to a sampling frequency. A one picture element delayed sampled picture signal derived therefrom and the original sampled picture signal are applied to a subtracter 78, so as to form an inter-element differential picture signal, an absolute value thereof derived from an absoluter 79 being applied to a lowpass filter 80. An appropriate low frequency components of the inter-element differential picture signal, which is derived from the lowpass filter 80 and corresponds to a required interval for changing the coding threshold level, is an accessing input terminal of a read only memory 81, another input terminal of which is applied with a threshold level controlling signal relating to the rate of appearance of the significant inter-element differential picture signal, which rate is calculated by the transmitting information amount calculator 75. Those signals applied to the read only memory 81 are quantized in response to the transmission of the coded picture signal, stepwise according to about ten quantizing steps which are sufficient in practice. Under the consideration of the appearance rate and the level range of the significant inter-element picture signal which can appear in the picture signal practically, the coding threshold levels of suitable steps can be derived from the read only memory 81 which is addressed by the combination of each step of the practically required quantizing control signal and each step of the quantized inter-element differential picture signal. The number of steps of those coding threshold levels is suitable in practice, so that this limited number of predicted threshold levels are stored in the read only memory 81 previously, so as to read out the required suitable coding threshold level therefrom under the access according to both of the coding threshold control signal and the significant inter-element differential picture signal which are applied to the input terminals thereof.

The above read out threshold levels can be applied to the threshold circuit 71 as the variable output signal of the threshold controller 76. Accordingly, regarding the interframe differential picture signal at the gentle shop of the contour portion of the picture, the appearance interval is restricted to such a narrow interval that, even if the spurious contour appears, it does not attract attention, so as to effect the change of the coding threshold level in response to the required condition.

Apparently from explained above, according to the above changeable threshold interframe coding system, it is possible that the appearance of spurious contour at the smooth contour portion, which is caused by raising the coding threshold level is suppressed, and that regarding the sharp contour portion, the increase of the appearance rate of the significant interframe differential picture signal is suppressed by raising the coding threshold level sufficiently. Accordingly, the digital transmission of the highly efficient interframe coding system can be attained by reducing the transmission bit rate without accompanied deterioration of the picture quality on account of the suitable change of the coding threshold level in response to the picture contents.

Nextly, another interframe coding system still further improved according to the present invention so as to effect an secondary prediction based on the preceding frame predicted picture signal, regarding the following frame picture signal will be explained hereinafter. This still further improved interframe coding system is arranged particularly for attaining the excellent interframe coding, even if the picture signal is applied with such a special treatment as fading, desolving and the like.

Generally speaking, in the ordinary interframe coding system in which the above secondary prediction is not effected, for transmitting efficiently the coded differential picture signal between two adjacent frames on principle, the further increase of the efficiency of transmission is intended by removing the minute interframe difference such as the noise components on account of the level comparison with an appropriately settled threshold level, so as to transmit only the significant interframe difference. However, in the receiving end in which the present frame picture signal is reproduced from the received significant interframe differential picture signal, the predicted picture signal formed by adding the received interframe difference to the previously reproduced preceding frame picture signal, so that it is required in the sending end also that the difference between the present frame picture signal and the predicted picture signal which is employed as the preceding frame picture signal by adding the significant interframe difference to the original preceding frame picture signal and then delayed by one frame interval according to the same circuit arrangement as in the receiving end, so as to employ the same significant interframe differential picture signal in both of the sending and the receiving ends.

Figure 25:
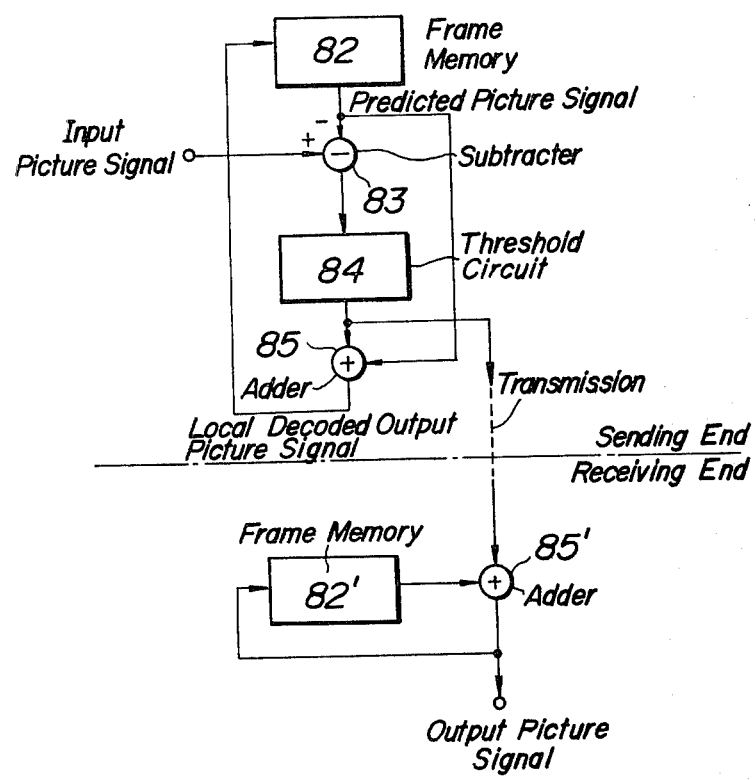
FIG. 25 is a block diagram showing a configuration of a conventional interframe coding apparatus.

A basic circuit arrangement of the above ordinary interframe coding system is shown in FIG. 25. In FIG. 25, an input picture signal is applied to a subtracter 83, so as to derive therefrom an interframe differential picture signal extracted from the predcted preceding frame picture signal derived from a frame memory 82. The interframe differential picture signal is applied to a threshold circuit 84 so as to derive therefrom a significant interframe picture signal from which minute components below an appropriately settled threshold level are removed. This significant interframe differential picture signal is transmitted to the receiving end after coding, as well as applied to an adder 85, so as to be added to the predicted preceding frame picture signal for forming a so-called local decoded output picture signal consisting of a predicted present frame picture signal. This predicted present frame picture signal is applied to the frame memory 82, so as to be delayed by one frame interval for forming the aforesaid predicted preceding frame picture signal.

On the other hand, in the receiving end, the received significant interframe differential picture signal is applied to an adder 85' similarly as in the sending end, so as to be added to a predicted preceding frame picture signal derived from a frame memory 82' for forming a predicted present frame as a reproduced output picture signal. This predicted present frame picture signal is applied to the frame memory 82', a one frame delayed picture signal derived therefrom being employed as the above predicted preceding frame picture signal.

Further, it is necessary that, at such an appropriate timing as at the beginning of transmission of the interframe differential picture signal, the one frame orignal input picture signal or the one frame predicted picture signal derived from the adder 85 as the loal decoder output picture signal is stored in the frame memory 82 in the sending end, as well as the above one frame predicted picture signal is transmitted to the receiving end and then stored in the frame memory 82', so as to settle the initial condition. Moreover, a buffer memories are provided in the sending and the receiving ends respectively for averaging the appearance rate of the significant coded interframe differential picture signal which is varied in response to the picture contents, so as to maintain the bit rate of transmission of the significant coded interframe differential picture signal at a constant value.

In the above ordinary interframe coding system, in the case that the motion exists in the picture reproduced from the picture signal, the prediction of the presnet frame picture signal, which is based on the interframe differential picture signal formed of the predicted preceding frame picture signal, becomes to hit the truth hardly, so that the number of the significant coded interframe differential picture element signals is increased. Accordingly, it is customary for maintaining the bit rate of transmission as mentioned above at a constant value that the coding threshold level for discriminating the significant picture signal is raised, so that the quality of the picture reproduced in the receiving end cannot help being deteriorated by the decreased number of the transmitted significant picture element signals.

The above mentioned deterioration of the picture quality, which is caused by the raised coding threshold level, is hardly attract attention in the moving picture in essence. Moreover, it is possible in forming the interframe differential picture signal by employing the predicted preceding frame picture signal to effect te appropriate motion-compensation in response to the detected motion of the picture, so that it is possible also that the increase of the appearance rate of the significant picture element signal which is based on the increased error of the prediction as mentioned above, and further the raise of the coding threshold level is prevented.

However, in the case that the contrast of the picture in a wide area of the picture frame is varied by such a treatment as fading, desolving and the like, although the motion does not exist in the picture, the appearance rate of the significant coded interframe differential picture element signal is increased similarly as in the case that the motion exists in the picture, so that the above difficulty of the settlement of the coding threshold level is caused also, although this difficulty cannot be removed by the aforesaid motion-compensation, because any motion does not exist in the picture.

Accordingly, regarding the picture signal applied with such a treatment as fading, desolving and the like, the variation of the picture signal level between successive frames is at a constant rate in the whole area of the picture frame, that is, it can be regarded as substantially linear, so that the secondary prediction of the level difference between the present frame and the preceding frame can be performed according to the extrapolation based on the level difference between the preceding frame and the further preceding frame, and it should be possible that the appearance rate of the significant interframe level differential picture element signal is reduced by employing the above interframe difference signal obtained by the secondary prediction.

Figure 26:
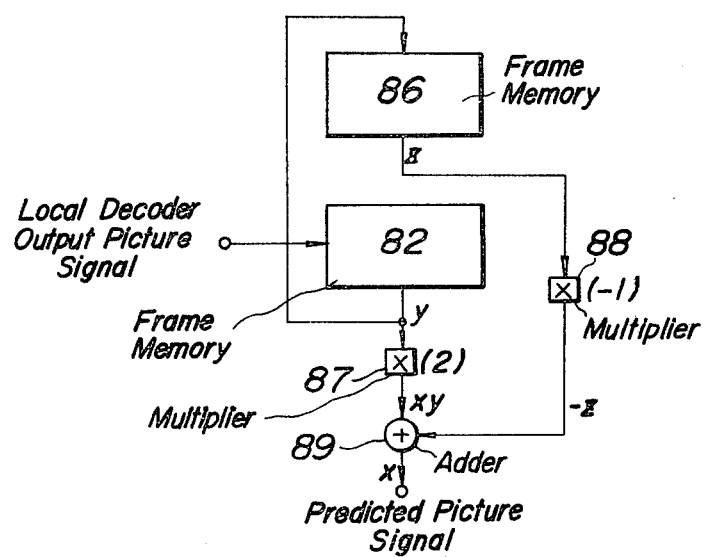
FIG. 26 is a block diagram showing a configuration of a conventional interframe difference secondary prediction apparatus.

Nextly, a conventional circuit arrangement for forming the interframe differential picture signal according to the secondary prediction is shown in FIG. 26. In FIG. 26, the predicted present frame picture signal as the local decoder output signal in the sending end of the circuit arrangement shown in FIG. 25 is applied to the frame memory 82 similarly as in the circuit arrangement shown in FIG. 25, so as to be delayed by one frame interval for forming the predicted preceding frame picture signal "y" to be employed in forming the interframe differential picture signal. Further, in order to obtain the one frame preceding interframe differential picture signal required for the aforesaid secondary prediction of the interframe differential picture signal, the predicted preceding frame picture signal "y" derived from the frame memory 82 is applied to another frame memory 86, so as to be delayed by further one frame interval for forming the predicted further preceding frame picture signal "Z". The above predicted preceding frame picture signal "y" is applied to a multiplier 87 also, so as to be multiplied by two. The output signal thereof is applied to an adder 89, as well as the predicted further preceding frame picture signal "Z" which has been multiplied by "−1" in a multiplier 88 is applied to the adder 89 also, so as to be added to each other according to the following equation.

$$X = 2y - Z$$

As a result, the predicted present frame picture signal "X" can be obtained under the secondary prediction according to the above equation.

However, in the case that the transmission of the coded interframe differential picture signal is performed in the circuit arrangement shown in FIG. 25, based on the predicted present frame picture signal "X" which is formed by the secondary prediction employing the further preceding frame picture signal "Z" and the preceding frame picture signal "y" which are formed as mentioned above, such a difficulty is caused that the quality of the reproduced picture is deteriorated extremely by the remarkable error of prediction in the reproduced picture as follows.

In the conventional circuit arrangement shown in FIG. 25 for transmitting the coded interframe differential picture signal, for improving the efficiency of code transmission, only the significant interframe difference signal, from which the minute interframe difference component is removed, is transmitted by referring to the coding threshold level. As a result thereof, the essential minute deterioration of the picture quality is caused by the minute error of prediction in comparison with the faithfully reproduced picture in the case the interframe difference signal is transmitted faithfully. In the circuit arrangement shown in FIG. 25, the prediction error is contained only in the significant interframe difference signal derived from the threshold circuit 84, that is, the predicted present frame picture signal as the local decoder output signal derived from the adder 85, whilst in the circuit arrangement in which the secondary prediction is effected, the prediction error contained in the predicted picture signal as the local decoder output signal applied to the frame memory 82 is multiplied by two in the predicted preceding frame picture signal which is multiplied by two and then applied to the adder 89, and further is multiplied by "−1" in the predicted further preceding frame picture signal "y" which is multiplied by "−1" and then applied to the adder 89 also. Those prediction errors are based on the prediction error contained in the predicted picture signal applied from the frame memory 82. However, those prediction errors can be regarded as random noises contained individually in the preceding frame and the further preceding frame picture signals respectively by referring to the practical input picture signals in those picture frames. As a result, the secondary predicted present frame picture signal contains a prediction error which corresponds to a random sum of prediction erros existing individually at the input side of the adder 89, and therefore reaches to at most three times of those prediction erros, and accordingly is remarkably larger than that in the primarily predcted picture signal. Consequently, the remarkable deterioration of the picture quality which is based on the above remarkably large prediction error is caused in the reproduced picture in the receiving end.

Nextly, the state of the increase of the prediction error caused in the picture signal by the conventional secondary prediction effected in the circuit arrangement shown in FIG. 26 will be explained hereinafter by referring to a schematic diagram shown in FIG. 27. In the conventional secondary prediction effected in the circuit arrangement shown in FIG. 26, under the assumption that the level variation between successive frames is linear, a signal level "x" at a point corresponding to the present frame on a line which consists of an elongated line section connecting a plotted point indicating the signal level of the further preceding frame picture signal "Z" and another plotted poin indicating the signal level of the preceding frame picture signal "y", and accordingly an interframe differential signal level (x−y) is obtained. So that, when level errors which are individual respectively even if those erros are equal to each other, are contained in the signal levels "Z" and "y" respectively, level errors of the same order, which are contained in every terms of the aforesaid equation x=2y−Z, are added to each other at random. As a result, a level error of at most three times of the above level erros are contained in the predicted present frame picture signal "x".

In still further another interframe coding system further improved according to the present invention so as to remove the above mentioned difficulty therefrom, for predicting secondarily the one frame preceding interframe differential picture signal, the level dfference between two adjacent frames is predicted by referring to the level difference between one frame preceding two adjacent frames which exceeds the coding threshold level.

The basic procedure of the secondary prediction of the interframe differential picture signal according to the present invention will be explained hereinafter by referring to the schematic diagram shown in FIG. 28 similarly as in FIG. 27.

Figure 27:
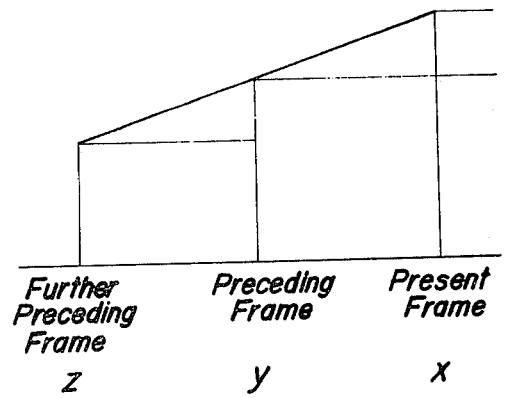
FIG. 27 is a level diagram showing a principle of a conventional interframe difference secondary prediction.
Figure 28:
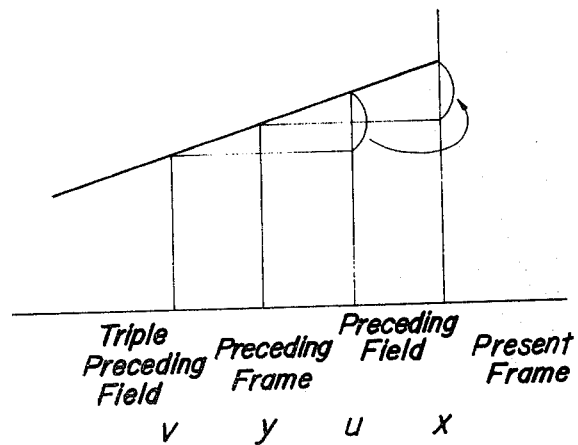
FIG. 28 is a level diagram showing a principle of an interframe difference secondary prediction according to the present invention.

In the conventional secondary prediction which is explained by referring to FIG. 27, the prediction error existing in the predicted present frame picture signal is corrected in response to the correlation between the preceding frame and the further preceding frame predicted picture signals, whilst, in the secondary prediction according to the present invention, the prediction of the present invention, the prediction of the interframe difference signal to be employed in predicting the present frame picture signal is performed by referring to the one frame preceding, preferably the one field preceding interframe difference signal, as shown in FIG. 28, so that, the prediction error regarding the present frame picture signal is, so to speak, corrected by the one frame preceding, preferably the one field preceding interframe difference signal, in other words, the prediction errors which are contained respectively in similar to each other before and after one frame interval, preferably one field interval, are cancelled each other. That is to say, in the conventional secondary prediction, the prediction erros contained respectively and individually in the preceding frame and the further preceding frame picture signals are added to each other at random, so that the one frame preceding predicted interframe difference signal is increased remarkably, and furthermore the prediction error existing in the predicted present frame picture signal is corrected by the above remarkably increased one frame preceding predicted interframe difference signal. As a result, the prediction error existing in the predicted present frame picture signal is rather increased.

Contrarily, in the secondary prediction according to the present invention, the prediction error existing in the predicted present frame interframe difference signal is corrected by the one frame preceding predicted interframe difference signal which is formed by delaying the predicted present frame interframe difference signal by one frame interval, preferably by one field interval. As a result, it is possible to cancel the prediction error at most perfectly according to the above secondary prediction of the present invention, and, particularly in the case that the present frame interframe difference signal is regarded as zero under the discrimination referred to the coding threshold level, the one frame preceding interframe difference signal employed in the above secondary prediction is regarded as zero also, so that such as erroneous operation can be prevented sufficiently that, when the picture signal is not varied at all between adjacent frames in practice, an inadequate interframe difference signal is transmitted as a result of the erroneous secondary prediction, so as to deteriorate the quality of the reproduced picture.

On the other hand, in the composite coloured picture signal of NTSC system and others, as known well, the phase of the colour subcarrier is opposite to each other before and after one frame interval, whilst it is co-phase before and after one field interval. Accordingly, in the case that the preceding frame and the further preceding frame predicted picture signals are formed by delaying the predicted present frame picture signal, so that it is necessary to perform the correction regarding those phase relations of the colour subcarrier. In such a case, if it is possible that the preceding frame and the further preceding frame predicted picture signals are formed respectively by delaying the predicted present frame picture signal by one frame interval and further by one more frame interval, and then the above conventional secondary prediction is performed by referring to those predicted picture signals, at least the above correction regarding the phase relations of the colour subcarrier may be performed. However, in this case, another kind of prediction error is caused by the shift of the positions of the horizontal scanning between before and after one frame interval, so as to increase the prediction error extremely.

On the contrary, in the above secondary prediction according to the present invention, which is effected by delaying the predicted present frame picture signal by one frame interval at a time, it is feared scarcely that the above extreme increase of the prediction error is caused by the above phase relations of the colour subcarrier and the shift of the positions of the horizontal scanning, so that, as shown in FIG. 28, if the prediction error of the predicted present frame picture signal is corrected by the one frame preceding secondary prediction according to the one frame delay at a time of the predicted present frame picture signal, such a feature of the above secondary prediction that the correction of the phase relations of the colour subcarrier is unnecessary can be utilized sufficiently.

Moreover, such the aforesaid advantage of the above secondary prediction according to the present invention that, when the present frame interframe difference signal is regarded as zero under the discrimination referred to the coding threshold level, the one frame preceding interframe difference signal employed in the above secondary prediction is regardes as zero also, and, as a result, the transmission of any inadequate interframe difference signal is not feared at all to be carried out noticeably in the practical use of the coded interframe differential picture signal transmission, since the efficiency of the transmission of the coded picture signal is improved by raising the appearance rate of ther interframe difference signal having a signal level being substantially equal to the coding threshold level.

Nextly, an example of a circuit arrangement of the still further improved interframe coding system, in which the above secondary prediction according to the present invention is effected, will be explained by referring to FIGS. 29 and 30.

Figure 29:
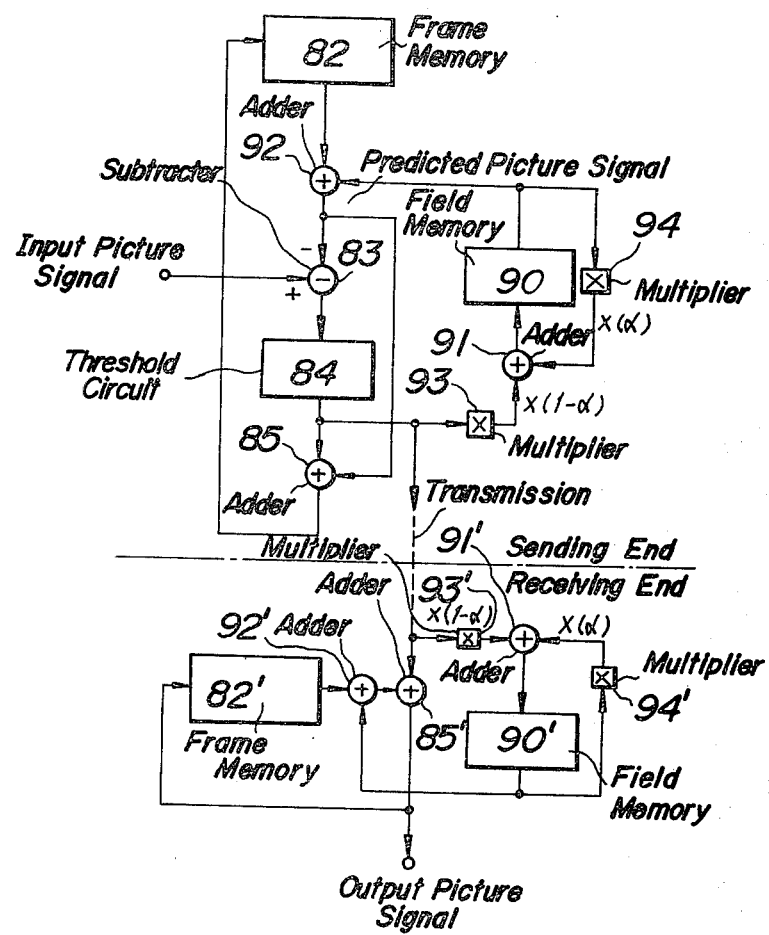
FIG. 29 is a block diagram showing an example of detailed configuration of an interframe difference secondary prediction apparatus according to the present invention.

In the circuit arrangement shown in FIG. 29, apparently from the comparison with the conventional circuit arrangement shown in FIG. 25 in which only the primary prediction is effected, in the case that the interframe difference signal is formed by applying the predicted preceding frame picture signal derived from the frame memory 82 and the input present frame picture signal to the adder 83, the interframe difference signal derived from the adder 83 through the threshold circuit 84 is basically fed bach to an adder 92 provided at the output side of the frame memory 82 though a field memory 90 positively, so as to correct the predicted preceding frame picture signal to be subtracted from the present frame picture signal by referring to the one field delayed interframe difference signal. Accordingly, the prediction error of the interframe difference signal, which is caused regarding the practical interframe level difference under the level discrimination referred to the coding threshold level, is contained in the predicted preceding frame picture signal to be subtracted for forming the interframe difference signal also, so that the prediction error is cancelled perfectly in the above interframe difference output signal which is applied with the above positive feedback, By the way, in the circuit arrangement shown in FIG. 29 of the interframe coding system according to the present invention, it is of course that the same correction of the prediction error according to the positive feedback as in the sending end is performed by the positive feedback through a field memory 90' in the receiving end.

As mentioned above, in the case that the correction of the prediction error is performed by adding the one field delayed interframe difference signal to the predicted preceding frame picture signal derived from the frame memory 82 in the adder 92, the level variation of the picture signal which is caused by such a treatment as fading, desolving and the like is not so large between two adjacent frames or fields, so that the excellently precise prediction of the interframe difference signal can be attained regarding the picture signal applied with such a treatment as fading, desolving and the like also. Accordingly, the prediction correcting signal to be added to the predicted preceding frame picture signal derived from the frame memory 82 contains the prediction error having a level of at most the same order as that of the coding threshold level, and further, when the level of the interframe difference signal is lower than the coding threshold level, the prediction correcting signal therefor becomes zero, so that it is not feared at all that the above remarkable increase of the prediction error is caused similarly as in the conventional secondary prediction.

However, in the case that the prediction error in the sending end becomes once zero under the above mentioned correction of the prediction error according to the one field delayed positive feedback, as well as the present frame picture signal can be predicted perfectly by referring to the preceding frame picture signal in the receiving end, it is not required to transmit the interframe difference signal at all, and further the interframe difference signal formed in the sending end becomes zero, and accordingly the prediction correcting signal to be used for the succeeding prediction becomes zero, so that, immediately after the prediction error becomes once zero, the correction of the prediction error is not effected at all, and, as a result, the prediction error is increased. However, when the prediction error is increased, and, as a result, the interframe difference signal to be transmitted is enlarged, the sufficient prediction correcting signal can be obtained again, so that the prediction error becomes zero again immediately after the prediction error is increased. Consequently, so long as the one field delayed interframe difference signal is fed back positively as it is, the increase and the decrease of the prediction error is repeated alternately as mentioned above, so that, in the practical use, the one field delayed interframe difference signal is averaged regarding the time, so as to realize such a state that the prediction correcting signal is not varied significantly during a few successive frames or fields. That is, the prediction correcting signal is fed back positively in a form of low frequency component having a low frequency being similar to the field frequency or the frame frequency.

In the above circuit arrangement shown in FIG. 29, in order to apply the lowpass filtering operation regarding such a low frequency as the field frequency to the one field delayed interframe difference signal employed as the prediction correcting signal, a lowpass filter in a form of a kind of field period comb type filter, that is, a so-called temporal filter is formed by utilizing skillfully a field memory 90 provided for delaying the interframe difference signal by one field interval, so as to feed back positively the delayed output signal of the field memory 90 to the input side thereof.

That is to say, the interframe difference signal derived from the threshold circuit 84 is applied to the field memory 90 through a multiplier 93 and an adder 91 successively. The one field delayed interframe difference signal derived therefrom is applied to the output side of the frame memory 82, so as to be added to the predicted preceding frame picture signal derived therefrom in an adder 92, as well as applied to the adder 91 inserted at the input side of the field memory 90 through a multiplier 94, so as to form the above field frequency passing filter according to the positive feedback. Another multiplier 93 inserted at the input side of the field memory 90 also is provided for multiplying the input signal of the above temporal filter by a coefficient $(1-\alpha)$, whilst the multiplier 94 inserted at the feedback path of the field memory 90 is provided for multiplying the output signal of the above temporal filter by a coefficient "$\alpha$" and then feeding back it positively to the input side thereof in such a manner that the amount of feedback, and accordingly the grade of filterng, that is, the grade of averaging with regard to the time can be adjusted in response to the value of the coefficient "$\alpha$", and furhter the input and the output levels of the temporal filter are not varied by the amount of feedback, that is, the grade of averaging on account of the correlation of the coefficients $(1-\alpha)$ and "$\alpha$" of the multipliers 93 and 94, so as to be kept constantly, and, as a result, when the coefficient "$\alpha$" is settled to zero, the one frame delayed interframe difference signal is added to the predicted preceding frame picture signal as it is.

By the way, as shown in FIG. 29, in the receiving end also, just the same lowpass filtering operation as in the sending end is effected by employing a multiplier 93', an adder 91', a field memory 90', another multiplier 94' and another adder 92'.

Moreover, the correction of the prediction error according to the present invention, which is effected by feeding back the interframe difference signal positively, can be effected similarly as mentioned above, apparently from the mentioned above by referring to FIG. 28, even if the field memories 90, 90' are replaced with other kinds of frame memories respectively, so as to feed back the one frame delayed interframe difference signal positively.

On the other hand, apparently from the mentioned above, in case of the secondary prediction according to the present invention, that is, the correction of the prediction error existing in the interframe difference signal, in order to prevent the alternate repetition of the increase and decrease of the prediction error which is caused by the simple positive feedback of the prediction correcting signal consisting, for instance, of the one field delayed interframe difference signal, it is preferable that the grade of averaging the prediction correcting signal with regard to the time is varied in response to the hit rate of the prediction, that is, the grade of the interframe level difference. For example, when the prediction hits preferably, so as to reduce the interframe level difference below the coding threshold level, the prediction correcting signal should be averaged sufficiently, so as to prevent the excessive correction of the prediction, whilst, when the interframe level difference is increased, the prediction correcting signal should not be averaged so sufficiently, so as to effect the sufficient correction of the prediction.

Nextly, an example of a circuit arrangement of the above prediction correcting apparatus according to the present invention in which the amount of feedback of the prediction correcting signal is varied in response to the level of the interframe difference signal, will be explained hereinafter by referring to FIG. 30.

Figure 30:
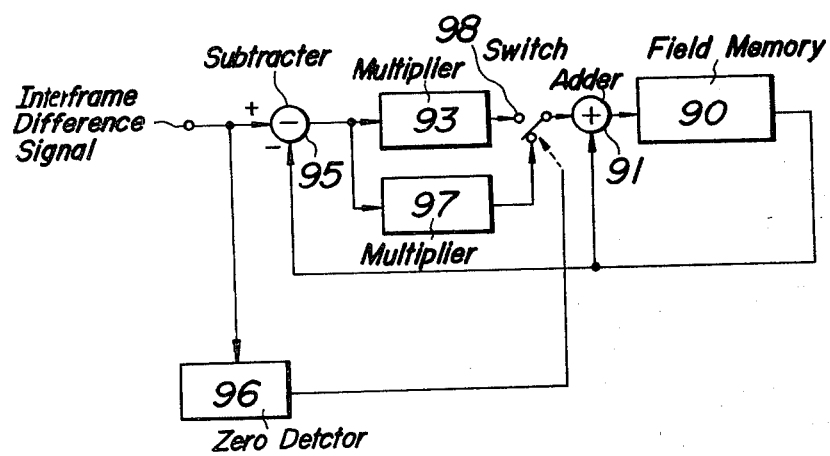
FIG. 30 is a block diagram showing another example of detailed configuration of the interframe difference secondary prediction apparatus according to the present invention.

In FIG. 30, unlikely from that shown in FIG. 29, any multiplier is not inserted in the feedback path of the field memory 90, whilst the output signal of the field memory 90 is applied to the adder 91, so as to be fed back directly to the inputside thereof positively, as well as applied to a subtracter 95 inserted at the inputside of the multiplier 93, so as to maintain the ratio between the input and the output levels at a constant value, regardless of the coefficient multiplied to the prediction correcting signal, that is, the grade of averaging of the prediction correcting signal.

Furthermore, in the circuit arrangement shown in FIG. 30, another multiplier 97 is arranged in parallel with the multiplier 93, and a switch 98 is controlled by an output signal of a zero detector 96 which is applied with the input interframe difference signal, so as to insert the multiplier 97 having a smaller multiplying coefficient into the input circuit of the field memory 90 for reducing the amount of feedback of the prediction correcting signal.

Apparently from the explained above, in the above prediction correcting apparatus according to the present invention, the excellently precise prediction of the interframe level difference can be effected regarding the picture signal applied with such a treatment as fading, desolving and the like, so that the transmission efficiency of the coded interframe differential picture signal can be improved remarkably higher than that in the conventional apparatus.

What is claimed is:

1. A motion-compensated interframe coding system, wherein an attended block consisting of a plurality of picture elements is settled in attended one frame of television picture signal, and a plurality of reference blocks which consist of a plurality of picture elements respectively and correspond to said attended frame respectively are settled in a preceding frame which precedes said attended frame by one frame interval, and a plurality of correlations between said attended block and said plurality of reference blocks are examined respectively, and a motion vector representing a motion of picture between two adjacent frames is detected according to relative positions between said attended block and one of said plurality of reference blocks regarding which one reference block the strongest correlation can be examined, and a motion of a predicted picture signal of said attended frame which is formed by correcting a picture signal of said preceding frame by referring to said motion of picture is compensated according to said motion vector so as to form a motion-compensated picture signal, and a difference between said motion-compensated picture signal and said picture signal of said attended frame is compared with a coding threshold level so as to discriminate a motion-compensated interframe differential picture signal which exceeds said coding threshold level, and said motion-compensated interframe differential picture signal is coded and transmitted, comprising
   a shift means for shifting said plurality of reference blocks from previously settled positions respectively in a direction opposite to said motion vector and by a distance corresponding to said motion vector prior to the examination of correlations, and
   a calculation means for accumulating logarithms of absolute values of differences of picture element signals corresponding to each other respectively between said attended block and said plurality of reference blocks over whole ranges of said attended frame and said preceding frame.

2. A motion-compensated interframe coding system as claimed in claim 1, wherein said motion-compensated interframe differential picture signal between said attended frame and said preceding frame is predicted by averaging at a predetermined rate a plurality of motion-compensated interframe differential picture signals between respective two adjacent frames which precede said preceding frame successively.

3. A motion-compensated interframe coding system as claimed in claim 1, wherein said coding threshold level can be settled in response to a higher frequency range component of the television picture signal.

4. A motion-compensated interframe coding system as claimed in claim 3, wherein said motion-compensated interframe differential picture signal between said attended frame and said preceding frame is predicted by averaging at a predetermined rate a plurality of motion-compensated interframe differential picture signals between respective two adjacent frames which precede said preceding frame successively.

5. A motion-compensated interframe coding system as claimed in claim 1, wherein said motion vector is detected regarding the attended frame.

6. A motion-compensated interframe coding system as claimed in claim 5, wherein a prediction error existing in said predicted picture signal of said attended frame is removed by employing selectively either the picture signal of said preceding frame or the predicted picture signal of said attended frame as said predicted picture signal in response to a result of comparison with the picture signal of said attended frame.

7. A motion-compensated interframe coding system as claimed in claim 6, wherein either one of the picture signal of said preceding frame and the predicted picture signal of said attended frame which one is less different from the picture signal of said attended frame is employed as said predicted picture signal.

8. A motion-compensated interframe coding system as claimed in claim 7, wherein said coding threshold level can be settled in response to a higher frequency range component of the television picture signal.

9. A motion-compensated interframe coding system as claimed in claim 8, wherein said motion-compensated interframe differential picture signal between said attended frame and said preceding frame is predicted by averaging at a predetermined rate a plurality of motion-compensated interframe differential picture signals between respective two adjacent frames which precede said preceding frame successively.

10. A motion-compensated interframe coding system as claimed in claim 7, wherein said motion-compensated interframe differential picture signal between said attended frame and said preceding frame is predicted by averaging at a predetermined rate a plurality of motion-compensated interframe differential picture signals respective two adjacent frames which precede said preceding frame successively.

11. A motion-compensated interframe coding system as claimed in claim 6, wherein, when an absolute value of a difference between the picture signal of said preceding frame and the predicted picture signal of said attended frame and an absolute value of a difference between the picture signal of said preceding frame and the picture signal of said attended frame do not exceed respectively predetermined levels, the picture signal of said preceding frame is employed as said predicted picture signal.

12. A motion-compensated interframe coding system as claimed in claim 11, wherein said motion-compensated interframe differential picture signal between said attended frame and said preceding frame is predicted by averaging at a predetermined rate a plurality of motion-compensated interframe differential picture signals between respective two adjacent frames which precede said preceding frame successively.

13. A motion-compensated interframe coding system as claimed in claim 11, wherein said coding threshold level can be stttled in response to a higher frequency range component of the television picture signal.

14. A motion-compensated interframe coding system as claimed in claim 13, wherein said motion-compensated interframe differential picture signal between said attended frame and said preceding frame is predicted by averaging at a predetermined rate a plurality of motion-compensated interframe differential picture signals between respective two adjacent frames which precede said preceding frame successively.

15. A motion compensated interframe coding system as claimed in claim 1, wherein, when a zero vector is detected periodically as said motion vector regarding said attended frame, said motion vector has been detected with regard to blocks being adjacent to said attended block in said attended frame and one of said plurality of reference blocks regarding which one reference block the strongest correlation can be examined.

16. A motion-compensated interframe coding system as claimed in claim 15, wherein said motion-compensated interframe differential picture signal between said attended frame and said preceding frame is predicted by averaging at a predetermined rate a plurality of motion-compensated interframe differential picture signals between respective two adjacent frames which precede said preceding frame successively.

17. A motion-compensated interframe coding system as claimed in claim 15, wherein said coding threshold level can be settled in response to a higher frequency range component of the television picture signal.

18. A motion-compensated interframe coding system as claimed in claim 17, wherein said motion-compensated interframe differential picture signal between said attended frame and said preceding frame is predicted by averaging at a predetermined rate a plurality of motion-compensated interframe differential picture signals between respective two adjacent frames which precede said preceding frame successively.

19. A motion-compensated interframe coding system, wherein an attended block consisting of a plurality of picture elements is settled in attended one frame of television picture signal, and a plurality of reference blocks which consist of a plurality of picture elements respectively and correspond to said attended frame respectively are settled in a preceding frame which precedes said attended frame by one frame interval, and a plurality of correlations between said attended block and said plurality of reference blocks are examined repectively, and a motion vector representing a motion of picture between two adjacent frames is detected according to relative positions between said attended block and one of said plurality of reference blocks regarding which one reference block the strongest correlation can be examined, and a motion of a predicted picture signal of said attended frame which is formed by correcting a picture signal of said preceding frame by referring to said motion of picture is compensated according to said motion vector so as to form a motion-compensated picture signal, and a difference of said motion-compensated picture signal between two adjacent frames is compared with a coding threshold level so as to discriminate a motion-compensated interfame differential picture signal which exceeds said coding threshold level, and said motion-compensated interframe differential picture signal is coded and transmitted, comprising a shift means for shifting said plurality of reference blocks from previously settled positions respectively in a direction opposite to said motion vector and by a distance corresponding to said motion vector prior to the examination of correlations, which motion vector has been detected with regard to blocks being adjacent to said attended block in said attended frame and one of said plurality of reference blocks regarding which one reference block the strongest correlation can be examined.

20. A motion-compensated interframe coding system as claimed in claim 19, wherein said motion-compensated interframe differential picture signal between said attended frame and said preceding frame is predicted by averaging at a predetermined rate a plurality of motion-compensated interframe differential picture signals between respective two adjacent frames which precede said preceding frame successively.

21. A motion-compensated interframe coding system as claimed in claim 19, wherein a prediction error existing in said predicted picture signal of said attended frame is removed by employing selectively either the picture signal of said preceding frame or the predicted picture signal of said attended frame as said predicted picture signal in response to a result of comparison with the picture signal of said attended frame.

22. A motion-compensated interframe coding system as claimed in claim 19, wherein said coding threshold level can be settled in response to a higher frequency range component of the television picture signal.

23. A motion-compensated interframe coding system as claimed in claim 22, wherein said motion-compensated interframe differential picture signal between said attended frame and said preceding frame is predicted by averaging at a predetermined rate a plurality of motion-compensated interframe differential picture signals between respective two adjacent frames which precede said preceding frame successively.

24. A motion-compensated interframe coding system as claimed in claim 19, wherein a prediction error existing in said predicted picture signal of said attended frame is removed by employing selectively either the picture signal of said preceding frame or the predicted picture signal of said attended frame as said predicted picture signal in response to a result of comparison with the picture signal of said attended frame.

25. A motion-compensated interframe coding system as claimed in claim 24, wherein either one of the picture signal of said preceding frame and the predicted picture signal of said attended frame which one is less different from the picture signal of said attended frame is employed as said predicted picture signal.

26. A motion-compensated interframe coding system as claimed in claim 25, wherein said coding threshold level can be settled in response to a higher frequency range component of the television picture signal.

27. A motion-compensated interframe coding system as claimed in claim 26, wherein said motion-compensated interframe differential picture signal between said attended frame and said preceding frame is predicted by averaging at a predetermined rate a plurality of motion-compensated interframe differential picture signals between respective two adjacent frames which precede said preceding frame successively.

28. A motion-compensated interframe coding system as claimed in claim 24, wherein, when an absolute value of a difference between the picture signal of said preceding frame and the predicted picture signal of said attended frame and an absolute value of a difference between te picture signal of said preceding frame and the picture signal of said attended frame do not exceed respectively predetermined levels, the picture signal of said preceding frame is employed as said predicted picture signal.

29. A motion-compensated interframe coding system as claimed in claim 25, wherein said motion-compensated interframe differential picture signal between said attended frame and said preceding frame is predicted by averaging at a predetermined rate a plurality of motion-compensated interframe differential picture signals between respective two adjacent frames which precede said preceding frame successively.

30. A motion-compensated interframe coding system as claimed in claim 28, wherein said motion-compensated interframe differential picture signal between said attended frame and said preceding frame is predicted by averaging at a predetermined rate a plurality of motion-compensated interframe differential picture signals between respective two adjacent frames which precede said preceding frame successively.

31. A motion-compenated interframe coding system as claimed in claim 28, wherein said coding threshold level can be settled in response to a higher frequency range component of the television picture signal.

32. A motion-compensated interframe coding system as claimed in claim 31, wherein said motion-compensated interframe differential picture signal between said attended frame and said preceding frame is predicted by averaging at a predetermined rate a plurality of motion-compensated interframe differential picture signals between respective two adjacent frames which precede said preceding frame successively.

* * * * *